US012288519B2

(12) United States Patent
Zhang et al.

(10) Patent No.: US 12,288,519 B2
(45) Date of Patent: Apr. 29, 2025

(54) DISPLAY SUBSTRATE, DRIVING METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Tiaomei Zhang, Beijing (CN); Ziyang Yu, Beijing (CN); Wenbo Chen, Beijing (CN); Haigang Qing, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/269,766

(22) PCT Filed: Dec. 23, 2021

(86) PCT No.: PCT/CN2021/140857

§ 371 (c)(1),
(2) Date: Jun. 27, 2023

(87) PCT Pub. No.: WO2023/115457

PCT Pub. Date: Jun. 29, 2023

(65) Prior Publication Data

US 2025/0006122 A1 Jan. 2, 2025

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
None
See application file for complete search history.

(56) References Cited

U.S. PATENT DOCUMENTS

2016/0155387 A1 6/2016 Kim et al.
2016/0163247 A1 6/2016 Lee et al.
(Continued)

FOREIGN PATENT DOCUMENTS

CN 107301831 A 10/2017
CN 107871766 A 4/2018
(Continued)

OTHER PUBLICATIONS

International Search Report for PCT/CN2021/140857 Mailed Aug. 26, 2022.
(Continued)

*Primary Examiner* — Duane N Taylor, Jr.
(74) *Attorney, Agent, or Firm* — Ling Wu; Stephen Yang; Ling and Yang Intellectual Property

(57) ABSTRACT

Provided are a display substrate, a driving method thereof, and a display apparatus. The display substrate includes multiple sub-pixels, a sub-pixel includes a pixel drive circuit and a light emitting device, the pixel drive circuit includes an initial signal line (INIT), a reset signal line (Reset) and multiple transistors, the initial signal line includes a first branch (INIT-1). Multiple transistors include a drive transistor, a first reset transistor and a second reset transistor, the drive transistor provides a drive current to the light emitting device, the first reset transistor resets a gate of the drive transistor through the INIT-1 under control of the reset signal line. The second reset transistor resets a first terminal of the light emitting device through the INIT-1 under control
(Continued)

of the reset signal line. The first reset transistor and the second reset transistor in a same sub-pixel are controlled by a same reset signal line.

17 Claims, 26 Drawing Sheets

(52) U.S. Cl.
CPC ... *G09G 2310/061* (2013.01); *G09G 2310/08* (2013.01); *G09G 2320/0233* (2013.01)

(56) References Cited

U.S. PATENT DOCUMENTS

| | | | |
|---|---|---|---|
| 2017/0301280 A1 | 10/2017 | Ka et al. | |
| 2018/0082630 A1 | 3/2018 | Kim et al. | |
| 2018/0190190 A1 | 7/2018 | Xi et al. | |
| 2018/0204889 A1 | 7/2018 | Yu et al. | |
| 2018/0373070 A1 | 12/2018 | Zhao et al. | |
| 2019/0148465 A1 | 5/2019 | Yu et al. | |
| 2019/0392765 A1 | 12/2019 | Kuk et al. | |
| 2020/0294752 A1* | 9/2020 | Sun | G06F 3/0421 |
| 2020/0312239 A1 | 10/2020 | Ooyama | |
| 2021/0319754 A1 | 10/2021 | Shang et al. | |
| 2022/0165811 A1 | 5/2022 | Yoon et al. | |
| 2022/0254855 A1 | 8/2022 | Zhang et al. | |
| 2022/0277691 A1 | 9/2022 | Wang et al. | |
| 2022/0310010 A1 | 9/2022 | Cheng et al. | |
| 2023/0038017 A1 | 2/2023 | Wei et al. | |
| 2023/0148280 A1 | 5/2023 | Deng et al. | |

FOREIGN PATENT DOCUMENTS

| | | | |
|---|---|---|---|
| CN | 108352151 | A | 7/2018 |
| CN | 110634446 | A | 12/2019 |
| CN | 111261043 | A | 6/2020 |
| CN | 111462690 | A | 7/2020 |
| CN | 111613180 | A | 9/2020 |
| CN | 112419985 | A | 2/2021 |
| CN | 112490270 | A | 3/2021 |
| CN | 112585761 | A | 3/2021 |
| CN | 113223458 | A | 8/2021 |
| CN | 113253530 | A | 8/2021 |
| CN | 113261106 | A | 8/2021 |
| CN | 113516947 | A | 10/2021 |
| CN | 113782560 | A | 12/2021 |
| KR | 20160067318 | A | 6/2016 |
| WO | 2021189335 | A1 | 9/2021 |
| WO | 2021196530 | A1 | 10/2021 |

OTHER PUBLICATIONS

Office Action dated Oct. 20, 2023 for Chinese Patent Application No. 202180004161.6 and English Translation.

* cited by examiner

DISPLAY SUBSTRATE, DRIVING METHOD THEREOF, AND DISPLAY APPARATUS

CROSS-REFERENCE TO RELATED APPLICATION

The present application is a U.S. National Phase Entry of International Application No. PCT/CN2021/140857 having an international filing date of Dec. 23, 2021, the content of which is incorporated into this application by reference.

TECHNICAL FIELD

Embodiments of the present disclosure relate to, but are not limited to, the field of display technology, in particular to a display substrate and a driving method therefor, and a display apparatus.

BACKGROUND

An Organic Light Emitting Diode (OLED for short) and a Quantum-dot Light Emitting Diode (QLED for short) are active light emitting display apparatuses, and have advantages such as self-luminescence, wide viewing angle, high contrast ratio, low power consumption, very high response speed, lightness and thinness, flexibility, and low costs. With continuous development of display technologies, a flexible display that adopts an OLED or a QLED as a light emitting device and a Thin Film Transistor (TFT for short) to perform signal control, has become a mainstream product in the field of display at present.

SUMMARY

The following is a summary of subject matters described herein in detail. The summary is not intended to limit the protection scope of claims.

An embodiment of the present disclosure provides a display substrate including multiple sub-pixels, at least one of the multiple sub-pixels includes a pixel drive circuit and a light emitting device, the pixel drive circuit includes an initial signal line, a reset signal line and multiple transistors, and the initial signal line includes a first branch; the multiple transistors include a drive transistor configured to provide a drive current to the light emitting device, a first reset transistor configured to reset a gate of the drive transistor through the first branch of the initial signal line under control of the reset signal line, and a second reset transistor configured to reset a first terminal of the light emitting device through the first branch of the initial signal line under the control of the reset signal line; and the first reset transistor and the second reset transistor in the same sub-pixel are controlled by the same reset signal line.

In some exemplary embodiments, the first branch of the initial signal line extends in a first direction, and the first branch of the initial signal line is disposed in a same layer as active layers of the multiple transistors.

In some exemplary embodiments, the pixel drive circuit further includes a storage capacitor; within the same sub-pixel, both the first reset transistor and the second reset transistor are located between the first branch of the initial signal line and the storage capacitor.

In some exemplary embodiments, the first reset transistor is located on a side of the second reset transistor in the first direction within the same sub-pixel.

In some exemplary embodiments, the pixel drive circuit further includes a first light emitting control transistor, a second light emitting control transistor, and an anode connection electrode, the anode connection electrode is connected to a second electrode of the first light emitting control transistor through an anode via hole, wherein, the first light emitting control transistor, the anode via hole and the second light emitting control transistor are arranged in a first direction, and the anode via hole is located between the first light emitting control transistor and the second light emitting control transistor.

In some exemplary embodiments, active layers of the multiple transistors each include a channel region, a first region located on a side of the channel region and corresponding to a source electrode, and a second region located on the other side of the channel region and corresponding to a drain electrode, a first region of an active layer of the first reset transistor, a first region of an active layer of the second reset transistor, and the first branch of the initial signal line are connected to each other as an integrated structure.

In some exemplary embodiments, an active layer of the first reset transistor has an “L” shape, the reset signal line is provided with a first bump in each sub-pixel, and a region where the reset signal line and the first bump overlap with a channel region of the first reset transistor serves as gate electrodes of the first reset transistor with a double-gate structure.

In some exemplary embodiments, in a plane perpendicular to the display substrate, the display substrate includes a semiconductor layer, a first conductive layer, a second conductive layer, a third conductive layer, and a fourth conductive layer, that are arranged in sequence on a substrate, and an insulating layer arranged between the semiconductor layer and the first conductive layer or insulating layers between respective conductive layers;

- the semiconductor layer includes active layers of multiple transistors and the first branch of the initial signal line, the first conductive layer includes gate electrodes of the multiple transistors, the reset signal line and a first electrode plate of a storage capacitor, the second conductive layer includes a second electrode plate of the storage capacitor, the third conductive layer includes a second connection electrode, and the fourth conductive layer includes a second branch of the initial signal line;
- the second connection electrode is configured to connect the gate of the drive transistor and a second region of the first reset transistor through a via hole on an insulating layer, and the second branch of the initial signal line is connected to the first branch of the initial signal line through a via hole on an insulating layer; and
- an orthographic projection of the second branch of the initial signal line on the substrate at least partially overlaps with an orthographic projection of the second connection electrode on the substrate.

In some exemplary embodiments, the second branch of the initial signal line includes a main body portion extending in a second direction, and a bent portion including two first extension portions and a second extension portion disposed between the two first extension portions, the first extension portions extend in a first direction, the second extension portion extends in the second direction, the first direction intersects the second direction, and a width of the second extension portion in the first direction is greater than a width of the main body portion in the first direction.

In some exemplary embodiments, the third conductive layer further includes a first power supply line, a first connection electrode and a fourth connection electrode, the fourth conductive layer further includes an anode connection electrode, and a light emitting control transistor includes a first light emitting control transistor; the anode connection electrode connects the first connection electrode and the fourth connection electrode through a via hole on an insulating layer, the first connection electrode connects a second region of the first light emitting control transistor through a via hole on an insulating layer, and the fourth connection electrode connects a second region of the second reset transistor through a via hole on an insulating layer; and an orthographic projection of the anode connection electrode on the substrate at least partially overlaps with an orthographic projection of the first power supply line on the substrate.

In some exemplary embodiments, the orthographic projection of the anode connection electrode on the substrate at least partially overlaps with an orthographic projection of a second electrode of the first reset transistor on the substrate.

In some exemplary embodiments, the fourth conductive layer further includes a fifth connection electrode and a third branch of the initial signal line; the third branch of the initial signal line extends in a first direction, and the second branch of the initial signal line extends in a second direction, wherein the first direction intersects the second direction; the fifth connection electrode, the second branch of the initial signal line and the third branch of the initial signal line are connected to each other as an integrated structure, and an orthographic projection of the third branch of the initial signal line on the substrate at least partially overlaps with an orthographic projection of the first branch of the initial signal line on the substrate.

In some exemplary embodiments, the display substrate further includes dummy pixel rows among the multiple sub-pixels, a dummy pixel row includes multiple dummy sub-pixels, a dummy sub-pixel includes a dummy pixel drive circuit including a dummy reset transistor and a dummy data writing transistor, a channel region of the dummy reset transistor and a channel region of the dummy data writing transistor each have a broken structure.

In some exemplary embodiments, the dummy pixel drive circuit includes a dummy storage capacitor, a dummy initial signal line, a dummy reset signal line, a dummy light emitting signal line and a dummy scan signal line, the dummy light emitting signal line, a first electrode plate of the dummy storage capacitor and the dummy scan signal line are connected to each other as an integrated structure, the first electrode plate and a second electrode plate of the dummy storage capacitor and the dummy reset signal line are respectively connected to the first power supply line through a via hole on an insulating layer.

An embodiment of the disclosure further provides a display substrate including multiple sub-pixels, and dummy pixel rows located among the multiple sub-pixels. At least one of the multiple sub-pixels includes a pixel drive circuit and a light emitting device, and the pixel drive circuit includes an initial signal line, a reset signal line, a scan signal line, a light emitting signal line and multiple transistors; the multiple transistors include a drive transistor, a first reset transistor, and a second reset transistor, the drive transistor is configured to provide a drive current to the light emitting device, the first reset transistor is configured to reset a gate of the drive transistor through the initial signal line under control of the reset signal line, and the second reset transistor is configured to reset an anode of the light emitting device through the initial signal line under control of the scan signal line; and the display substrate includes multiple gate connection electrodes disposed across the dummy pixel rows, a gate connection electrode is configured to connect a gate electrode of a first reset transistor on a side of the dummy pixel row and a gate electrode of a second reset transistor on the other side of the dummy pixel row.

In some exemplary embodiments, the gate connection electrodes and gate electrodes of the multiple transistors are located on different conductive layers.

An embodiment of the present disclosure further provides a display apparatus, including the display substrate as described in any one of the above.

An embodiment of the disclosure further provides a method of driving a display substrate including multiple sub-pixels, at least one of the multiple sub-pixels includes a pixel drive circuit and a light emitting device, the pixel drive circuit includes a drive sub-circuit, a first reset sub-circuit, a second reset sub-circuit, a data writing sub-circuit, a compensation sub-circuit and a light emitting control sub-circuit, and the driving method includes:

in an initialization stage, the first reset sub-circuit resets a control terminal of the drive sub-circuit under control of a reset signal; the second reset sub-circuit resets a first terminal of the light emitting device under control of a reset signal; wherein, the first reset sub-circuit and the second reset sub-circuit in a same sub-pixel are controlled by a same reset signal line;

in a data writing and compensation stage, the data writing sub-circuit writes a data signal into the drive sub-circuit under control of a scan signal, and the compensation sub-circuit compensates the drive sub-circuit; and in a light emitting stage, the light emitting control sub-circuit applies a drive current generated by the drive sub-circuit to the light emitting device under control of a light emitting signal to enable the light emitting device to emit light.

Other aspects will become apparent after the drawings and the detailed description are read and understood.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure, but do not constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
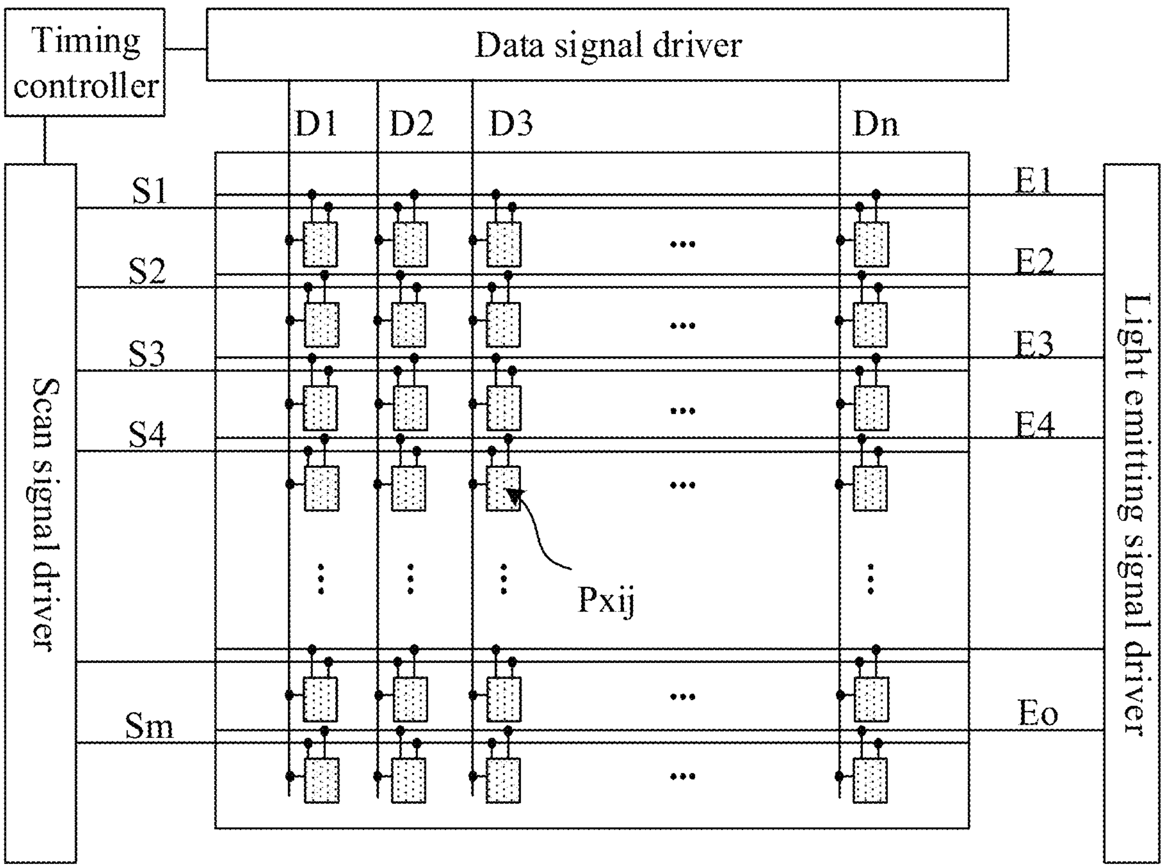
FIG. 1 is a schematic diagram of a structure of a display apparatus according to an embodiment of the present disclosure.

To make objectives, technical solutions, and advantages of the present disclosure clearer, the embodiments of the present disclosure will be described in detail below with reference to the accompanying drawings. It is to be noted that implementations may be practiced in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict.

In the drawings, sizes of various constituent elements, a thickness of a layer, or a region are exaggerated sometimes for clarity. Therefore, one implementation of the present disclosure is not necessarily limited to the dimensions, and shapes and sizes of various components in the drawings do not reflect actual scales. In addition, the drawings schematically illustrate ideal examples, and one implementation of the present disclosure is not limited to shapes, numerical values, or the like shown in the drawings.

Ordinal numerals such as "first", "second", and "third" in the specification are set to avoid confusion of constituent elements, but not set to make a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with a certain electrical effect" is not particularly limited as long as electrical signals may be sent and received between the connected constituent elements. Examples of the "element with the certain electrical effect" not only include electrodes and wirings, but also include switch elements (such as transistors), resistors, inductors, capacitors, other elements with various functions, etc.

In the specification, "parallel" refers to a state in which an angle formed by two straight lines is −10° or more than −10° and 10° or lower than 10°, and thus also includes a state in which the angle is −5° or more than −5° and 5° or lower than 5°. In addition, "perpendicular" refers to a state in which an angle formed by two straight lines is 80° or more than 80° and 100° or less than 100°, and thus also includes a state in which the angle is 85° or more than 85° and 95° or more than 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

FIG. 1 is a schematic diagram of a structure of a display apparatus. As shown in FIG. 1, an OLED display apparatus may include a timing controller, a data signal driver, a scan signal driver, a light emitting signal driver, and a pixel array. The pixel array may include multiple scan signal lines (S1 to Sm), multiple data signal lines (D1 to Dn), multiple light emitting signal lines (E1 to Eo), and multiple sub-pixels Pxij. In some exemplary implementations, the timing controller may provide a gray-scale value and a control signal which are suitable for a specification of the data signal driver, to the data signal driver, provide a clock signal, a scan start signal, etc., which are suitable for a specification of the scan signal driver, to the scan signal driver, and provide a clock signal, an emission stop signal, etc., which are suitable for a specification of the light emitting signal driver, to the light emitting signal driver. The data signal driver may generate data voltages to be provided to data signal lines D1, D2, D3, . . . , and Dn using the gray scale value and the control signal received from the timing controller. For example, the data signal driver may sample the gray scale value using a clock signal, and apply a data voltage corresponding to the gray scale value to the data signal lines D1 to Dn by taking a pixel row as a unit, wherein n may be a natural number. The scan signal driver may generate scan signals to be provided to scan signal lines S1, S2, S3, . . . , and Sm by receiving a clock signal, a scan start signal, and the like from the timing controller. For example, the scan signal driver may sequentially provide a scan signal with an on-level pulse to the scan signal lines S1 to Sm. For example, the scan signal driver may be constructed in a form of a shift register, and generate a scan signal in a manner of sequentially transmitting a scan start signal provided in a form of an on-level pulse to a next-stage circuit under control of the clock signal, wherein m may be a natural number. The light emitting signal driver may generate an emission signal to be provided to emitting signal lines E1, E2, E3, . . . , and Eo by receiving the clock signal, the transmission stop signal, and the like from the timing controller. For example, the light emitting signal driver may sequentially provide an emission signal with an off-level pulse to the light emitting signal lines E1 to Eo. For example, the light emitting signal driver may be constructed in a form of a shift register, and generate a light emitting signal in a manner of sequentially transmitting a light emitting stop signal provided in a form of an off-level pulse to a next-stage circuit under control of a clock signal, wherein o may be a natural number. The pixel array may include multiple sub-pixels Pxij. Each sub-pixel Pxij may be connected to a corresponding data signal line, a corresponding scan signal line, and a corresponding light emitting signal line, wherein i and j may be natural numbers. The sub-pixel Pxij may refer to a sub-pixel of which a transistor is connected to an i-th scan signal line and connected to a j-th data signal line.

Figure 2A:
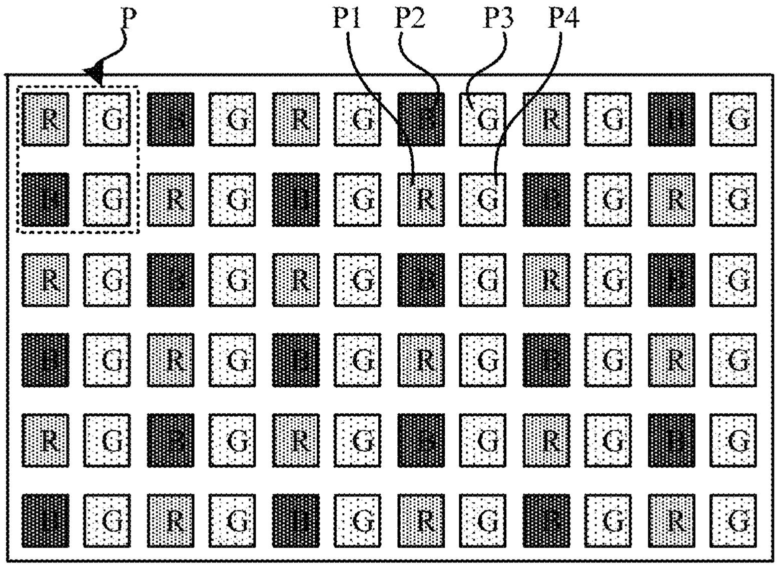
FIGS. 2A and 2B are schematic diagrams of two arrangement structures of sub-pixels according to an embodiment of the present disclosure.
Figure 2B:
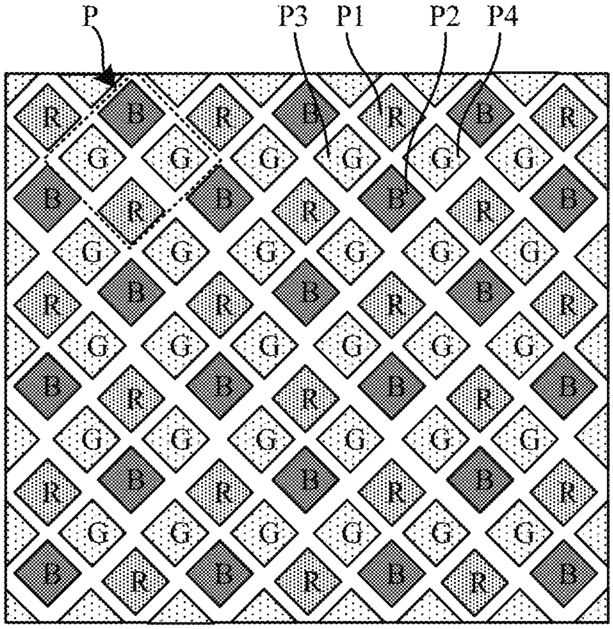

FIG. 2A and FIG. 2B are schematic diagrams of planar structures of display substrates. In an exemplary implementation, the display substrate may include multiple pixel units P arranged in a matrix manner, at least one pixel unit P may include one first sub-pixel P1 emitting a first color light, one second sub-pixel P2 emitting a second color light, and one third sub-pixel P3 and one fourth sub-pixel P4 emitting a third color light respectively. Each of the four sub-pixels may include a circuit unit and a light emitting device. The circuit unit may include a scan signal line, a data signal line and a light emitting signal line and a pixel drive circuit. The pixel drive circuit is respectively connected to the scan signal line, the data signal line, and the light emitting signal line. The pixel drive circuit is configured to receive the data voltage transmitted by the data signal line and output a corresponding current to the light emitting device under the control of the scan signal line and the light emitting signal line. The light emitting device in each sub-pixel is connected to a pixel drive circuit of the sub-pixel where the light emitting device is located, and is configured to emit light with a corresponding brightness in response to a current output by the pixel drive circuit of the sub-pixel where the light emitting device is located.

In an exemplary implementation, the first sub-pixel P1 may be a red sub-pixel (R) emitting red light, the second sub-pixel P2 may be a blue sub-pixel (B) emitting blue light, and the third sub-pixel P3 and the fourth sub-pixel P4 may be green sub-pixels (G) emitting green light. In some exemplary embodiments, the sub-pixel may have a shape of a rectangle, a rhombus, a pentagon, or a hexagon. In an exemplary implementation, four sub-pixels may be arranged in a manner of square to form a GGRB pixel arrangement, as shown in FIG. 2A. In another exemplary implementation, the four sub-pixels may be arranged in a manner of diamond to form an RGBG pixel arrangement, as shown in FIG. 2B. In some other exemplary implementations, the four sub-pixels may be arranged in a manner of side by side horizontally or side by side vertically or the like. In an exemplary embodiment, the pixel unit may include three sub-pixels, the three sub-pixels may be arranged in manner of side by side horizontally, side by side vertically or in a shape like a Chinese character "品". The present disclosure is not limited thereto.

In an exemplary embodiment, multiple sub-pixels sequentially arranged in the horizontal direction are referred to as a pixel row, and multiple sub-pixels sequentially arranged in the vertical direction are referred to as a pixel column; and the multiple pixel rows and the multiple pixel columns together form a pixel array arranged in an array.

Figure 3:
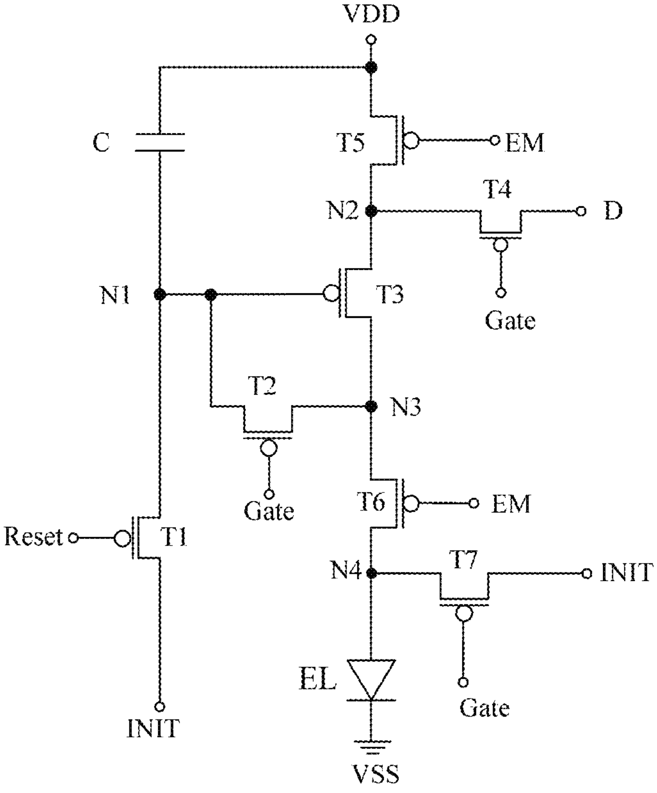
FIG. 3 is an equivalent circuit diagram of a pixel circuit according to an embodiment of the present disclosure.

In some exemplary implementations, the pixel drive circuit may have a structure of 3T1C, 4T1C, 5T1C, 5T2C, 6T1C, or 7T1C. FIG. 3 is a schematic diagram of an equivalent circuit of a pixel drive circuit according to an exemplary embodiment of the present disclosure. As shown in FIG. 3, the pixel drive circuit may include seven transistors (a first transistor T1 to a seventh transistor T7), one storage capacitor C and multiple signal lines (a data signal line D, a scan signal line Gate, a reset signal line Reset, an initial signal line INIT, a first power supply line VDD, a second power supply line VSS and a light emitting signal line EM).

In some exemplary implementations, a gate of the first transistor T1 is connected to the reset signal line Reset, a first electrode of the first transistor T1 is connected to the initial signal line INIT, and a second electrode of the first transistor T1 is connected to a first node N1. A gate of the second transistor T2 is connected to the scan signal line Gate, a first electrode of the second transistor T2 is connected to the third node N3, and a second electrode of the second transistor T2 is connected to the first node N1. A gate of the third transistor T3 is connected to a first node N1, a first electrode of the third transistor T3 is connected to a second node N2, and a second electrode of the third transistor T3 is connected to the third node N3. A gate of the fourth transistor T4 is connected to the scan signal line Gate, a first electrode of the fourth transistor T4 is connected to the data signal line D, and a second electrode of the fourth transistor T4 is connected to the second node N2. A gate of the fifth transistor T5 is connected to the light emitting signal line EM, a first electrode of the fifth transistor T5 is connected to the first power supply line VDD, and a second electrode of the fifth transistor T5 is connected to the second node N2. A gate of the sixth transistor T6 is connected to the light emitting signal line EM, a first electrode of the sixth transistor T6 is connected to the third node N3, and a second electrode of the sixth transistor T6 is connected to the fourth node N4 (i.e., a first electrode of the light emitting device). A gate of the seventh transistor T7 is connected to the scan signal line Gate, a first electrode of the seventh transistor T7 is connected to the initial signal line INIT, and a second electrode of the seventh transistor T7 is connected to the fourth node N4. A first terminal of the storage capacitor C is connected to the first power supply line VDD, and a second terminal of the storage capacitor C is connected to the first node N1.

In some exemplary embodiments, the first transistor T1 to the seventh transistor T7 may be P-type transistors or may be N-type transistors. Use of a same type of transistors in a pixel drive circuit may simplify a process flow, reduce process difficulties of a display panel, and improve a product yield. In some possible implementations, the first transistor T1 to the seventh transistor T7 may include P-type transistors and N-type transistors.

In some exemplary embodiment, a second electrode of the light emitting device is connected to the second power supply line VSS, a signal of the second power supply line VSS is a low-level signal continuously provided, and a signal of the first power supply line VDD is a high-level signal continuously provided. The scan signal line Gate is the scan signal line in the pixel drive circuits of the present display row, and the reset signal line Reset is the scan signal line in the pixel drive circuits of the last display row. That is, for the n-th display row, the scan signal line Gate is Gate (n) and the reset signal line Reset is Gate (n−1). The reset signal line Reset in the present display row and the scan signal line Gate in the pixel drive circuits of the last display row may be the same signal line, to reduce the signal lines of the display panel and achieve the narrow bezel of the display panel.

In some exemplary embodiments, the scan signal line Gate, the reset signal line Reset, the light emitting signal line EM, and the initial signal line INIT all extend along a horizontal direction, and the second power supply line VSS, the first power supply line VDD, and the data signal line D extend along a vertical direction.

In some exemplary embodiments, the light emitting device may be an organic light emitting diode (OLED), including a first electrode (anode), an organic light emitting layer, and a second electrode (cathode) that are stacked.

Figure 4:
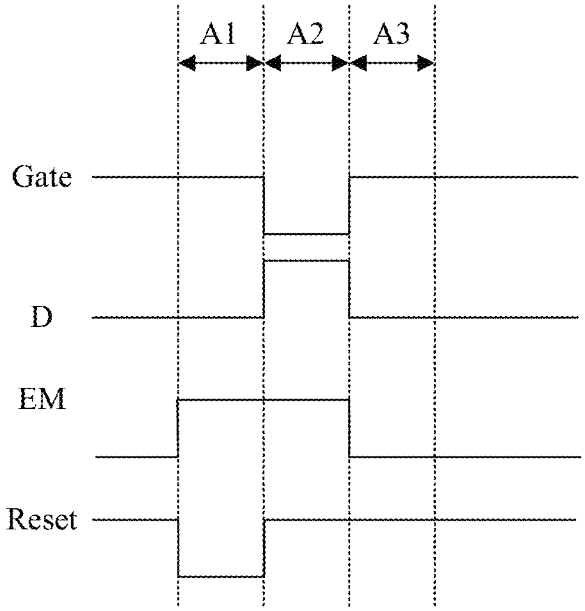
FIG. 4 is a schematic driving timing diagram of the pixel circuit shown in FIG. 3.

FIG. 4 is a working timing diagram of the pixel drive circuit shown in FIG. 3. An exemplary embodiment of the present disclosure will be described below through a working process of the pixel drive circuit shown in FIG. 4. The pixel drive circuit in FIG. 3 includes seven transistors (the first transistor T1 to the sixth transistor T7), a storage capacitor C1 and seven signal lines (the data signal line D, the scan signal line Gate, the reset signal line Reset, the initial signal line INIT, the first power supply line VDD, the second power supply line VSS and the light emitting signal line EM), and the seven transistors are all P-type transistors.

In an exemplary implementation, the working process of the pixel drive circuit may include following stages.

In a first stage A1, referred to as a reset stage, a signal of the reset signal line Reset is a low-level signal, and signals of the scan signal line Gate and the light emitting signal line EM are high-level signals. The signal of the reset signal line Reset is a low-level signal, so that the first transistor T1 is turned on, and a signal of the initial signal line INIT is provided to a first node N1 to initialize the storage capacitor C to clear an original data voltage in the storage capacitor. The signals of the scan signal line Gate and the light emitting signal line EM are the high-level signals, so that the second transistor T2, the fourth transistor T4, the fifth transistor T5, the sixth transistor T6, and the seventh transistor T7 are turned off. In this stage, the OLED does not emit light.

In a second stage A2, referred to as a data writing stage or a threshold compensation stage, a signal of the scan signal line Gate is a low-level signal, signals of the reset signal line Reset and the light emitting signal line EM are high-level signals, and the data signal line D outputs a data voltage. In this stage, a second end of the storage capacitor C is at a low-level, so the third transistor T3 is turned on. A signal of the scan signal line Gate is a low-level signal, so that the second transistor T2, the fourth transistor T4 and the seventh transistor T7 are turned on. The second transistor T2 and the fourth transistor T4 are turned on so that the data voltage output by the data signal line D is provided to the first node N1 through the second node N2, the turned-on third transistor T3, the third node N3, and the turned-on second transistor T2, and a sum of the data voltage output by the data signal line D and a threshold voltage of the third transistor T3 is charged into the storage capacitor C, wherein a voltage at the second terminal (the second node N2) of the storage capacitor C is Vdata+Vth, Vdata is the data voltage output by the data signal line D, and Vth is the threshold voltage of the third transistor T3. The seventh transistor T7 is turned on, so that an initialization voltage of the initial signal line INIT is provided to a first electrode of the OLED to initialize (reset) the first electrode of the OLED and clear a pre-stored voltage therein, thereby completing initialization to ensure that the OLED does not emit light. The signal of the reset signal line Reset is a high-level signal, so that the first transistor T1 is turned off. The signal of the light emitting signal line EM is the high-level signal, so that the fifth transistor T5 and the sixth transistor T6 are turned off.

In a third stage A3, referred to as a light emitting stage, the signal of the light emitting control signal line EM is a low-level signal, and the signals of the scan signal line Gate and the reset signal line Reset are both high-level signals. The signal of the light emitting signal line EM is a low-level signal, so that the fifth transistor T5 and the sixth transistor T6 are turned on. A supply voltage output by the first power supply line VDD provides a drive voltage to the first electrode of the OLED through the turned-on fifth transistor T5, third transistor T3 and sixth transistor T6, to drive the OLED to emit light.

In a driving process of the pixel drive circuit, a drive current flowing through the third transistor T3 (drive transistor) is determined by a voltage difference between a gate electrode and a first electrode of the third transistor T3. Since the voltage of the second node N2 is Vdata+Vth, the drive current of the third transistor T3 is:

$$I = K*(Vgs-Vth)^2 = K*[(Vdata+Vth-Vdd)-Vth]^2 = K*[(Vdata-Vdd)]^2$$

Herein, I is the drive current flowing through the third transistor T3, i.e., a drive current for driving the OLED, K is a constant, Vgs is the voltage difference between the gate electrode and the first electrode of the third transistor T3, Vth is the threshold voltage of the third transistor T3, Vdata is the data voltage output by the data signal line D, and Vdd is the power voltage output by the first power supply line VDD.

It may be seen from the above formula that the current I flowing through the light emitting device is unrelated to the threshold voltage Vth of the third transistor T3, so that an influence of the threshold voltage Vth of the third transistor T3 on the current I is eliminated, and uniformity of brightness is ensured.

Based on the above-mentioned working timing, in this pixel circuit, residual positive charges of the light emitting device, after the light emitting element emitted light last time, are eliminated, compensation for the gate voltage of the third transistor is achieved, an influence of drift of the threshold voltage of the third transistor on a drive current of the light emitting device is avoided, and uniformity of a displayed image and display quality of a display panel are improved.

Figure 5A:
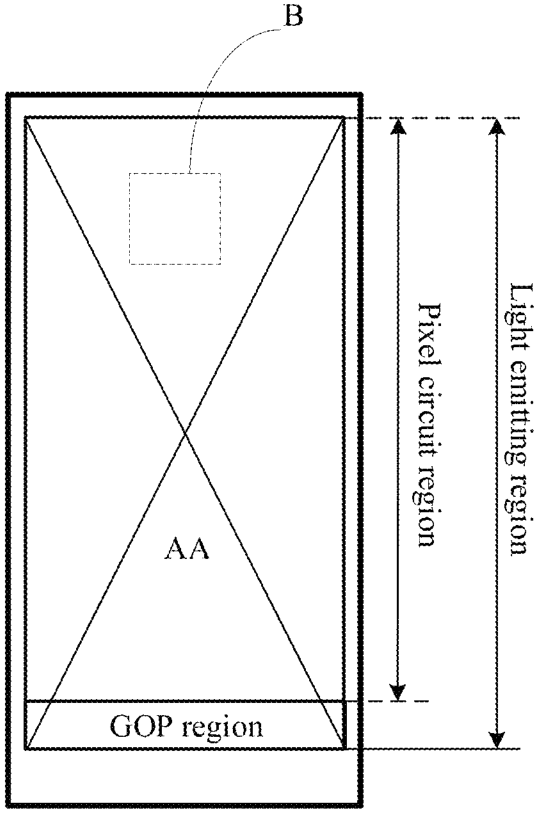
FIG. 5A is a schematic diagram of a planar structure of a display substrate according to an embodiment of the present disclosure.
Figure 5B:
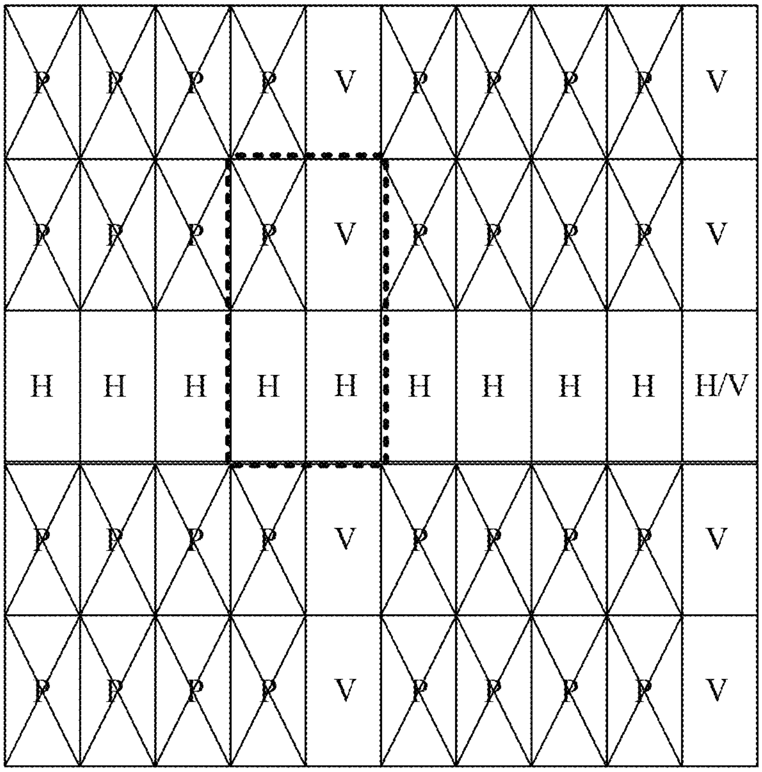
FIG. 5B is a schematic diagram of a pixel arrangement structure of the B region in FIG. 5A.

In recent years, with the rapid development of the display industry, consumers have more and more strict requirements for display bezels, and a narrow bezel or even no bezel has gradually become the trend. Compressing Fanout routes into Active Area (AA) is no longer a concept, instead a reality. An approach for placing fanout routines into an active display region is to longitudinally compress the pixels in the active display region. As shown in FIGS. 5A and 5B, densely-arranged compressed pixels are arranged in the GOP (Gate On Panel) region located near the bezel region of the active display region, and inserting dummy pixels in compressed pixels is used in the non-GOP region of the active display region. In FIG. 5B, P denotes a normal sub-pixel, H denotes an inserted dummy pixel row, and V denotes an inserted dummy pixel column.

Figure 5C:
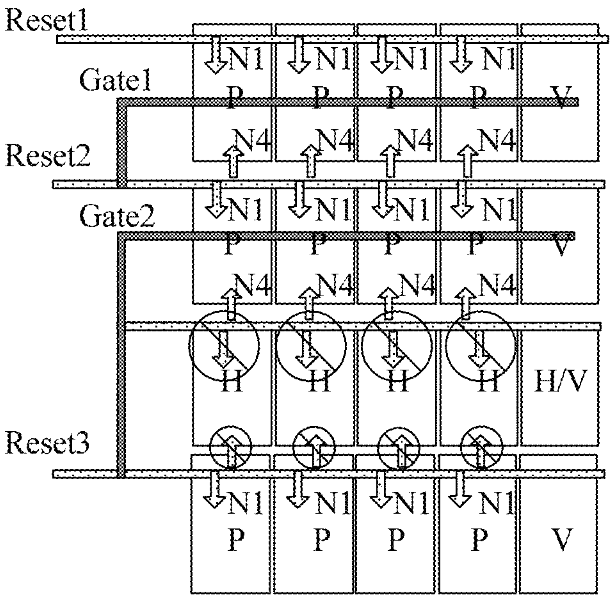
FIG. 5C is a schematic diagram of Gate driver On Array (GOA) loading of a display region.

However, a consequent problem is that there is a difference in the Loading of Gate driver On Array (GOA) signals between the region where dummy pixel lines are not inserted and the region where dummy pixel lines are inserted, in the active display region. As shown in FIG. 5C, if we continue to use the scan signal line Gate of the present row to drive the seventh transistors T7 of the preset row, in the region where dummy pixel lines are not inserted, one row of GOAs drives scan signal line Gate of one row and reset signal line Reset of one row, but in the region where dummy pixel lines are inserted, one row of GOAs drives scan signal line Gate of one row and reset signal lines Reset of two rows. That means that the loading of GOA in the region where dummy pixel lines are inserted is increased by one row compared with that in the region where dummy pixel lines are inserted, which is very negative to display. The reason is that the GOA loading in the region where dummy pixel lines are inserted is large, which will lead to the difference between the charging time of the region where dummy pixel lines are inserted and the charging time of the region where dummy pixel lines are not inserted, thus making the display effect of the display panel poor.

An embodiment of the present disclosure provides a display substrate including multiple sub-pixels, at least one sub-pixel includes a pixel drive circuit and a light emitting device, the pixel drive circuit includes an initial signal line, a reset signal line, a light emitting signal line and multiple transistors, and the initial signal line includes a first branch.

The multiple transistors include a drive transistor configured to provide a drive current to the light emitting device, a first reset transistor configured to reset a gate of the drive transistor through the first branch of the initial signal line under control of the reset signal line, and a second reset transistor configured to reset an anode of the light emitting device through the first branch of the initial signal line under the control of the reset signal line.

The first reset transistor and the second reset transistor in the same sub-pixel are controlled by the same reset signal line.

Figure 6A:
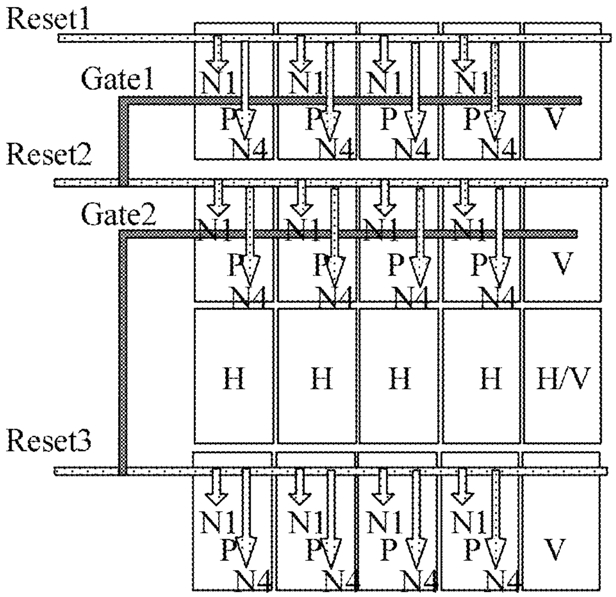
FIG. 6A is a schematic diagram of GOA loading of a display region according to an embodiment of the present disclosure.

As shown in FIG. 6A, the display substrate of an embodiment of the present disclosure adopts the same-level reset mode, that is, the first reset transistor and the second reset transistor in each row of sub-pixels are controlled by the same reset signal line in each row of sub-pixels, so that the GOAs in each row of sub-pixels drive scan signal line of a row and reset signal line of a row, thereby making the charging time of different regions same, and improving the display effect of the display panel.

As shown in FIGS. 3, 6B, 6C, and 6D, the display substrate includes multiple sub-pixels, at least one of which includes a pixel drive circuit and a light emitting device EL, the pixel drive circuit includes an initial signal line INIT, a reset signal line Reset, a light emitting signal line EM and multiple transistors.

Figure 6B:
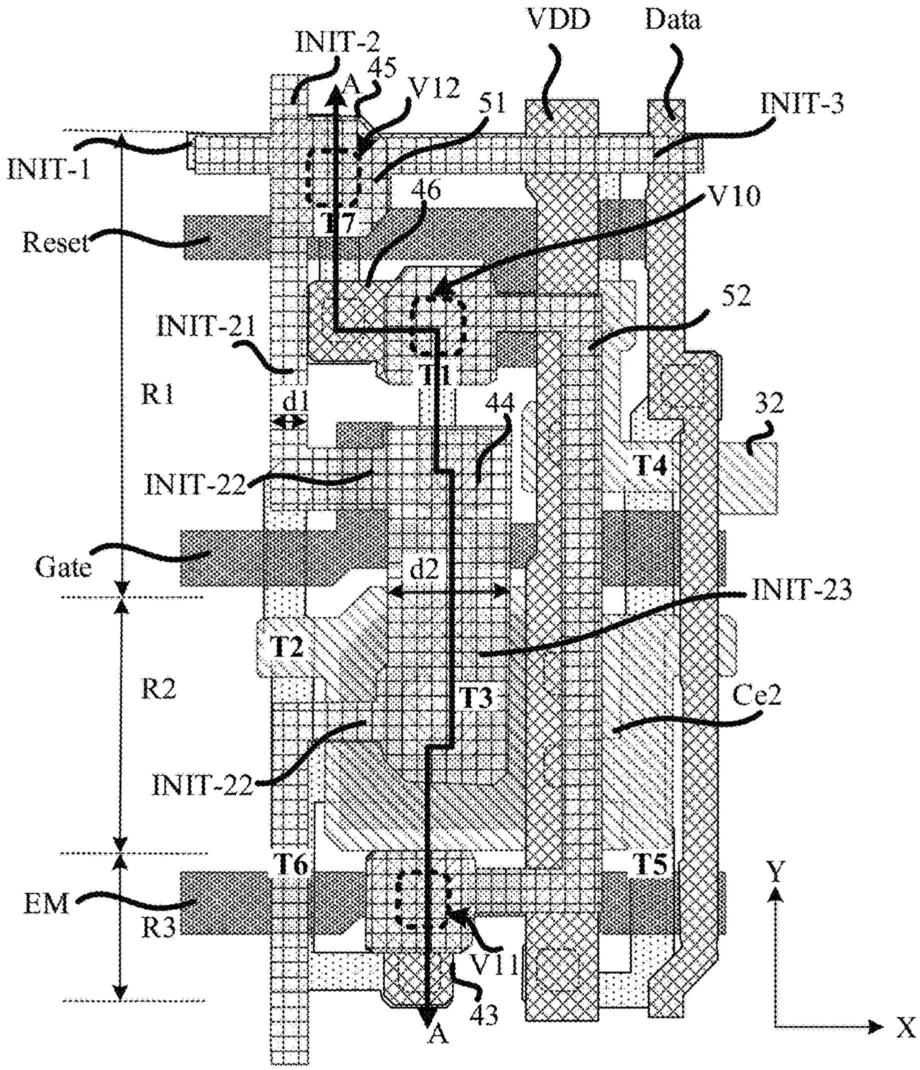
FIG. 6B is a schematic planar view of a display substrate after a fourth conductive layer for a normal pixel is formed according to an embodiment of the present disclosure.

The multiple transistors include a drive transistor (i.e., a third transistor T3 in FIG. 6B), a first reset transistor (i.e., a first transistor T1 in FIG. 6B) and a second reset transistor (i.e., a seventh transistor T7 in FIG. 6B). The drive transistor is configured to provide a drive current to the light emitting device, the first reset transistor is configured to reset a gate of the drive transistor via the first branch INIT-1 of the initial signal line under the control of the reset signal line Reset, and the second reset transistor is configured to reset a first terminal of the light emitting device via the first branch INIT-1 of the initial signal line under the control of the reset signal line Reset.

The first reset transistor and the second reset transistor in the same sub-pixel are controlled by the same reset signal line Reset.

In some exemplary embodiments, the multiple transistors further include a light emitting control transistor configured to allow or forbid a drive current to pass through under the control of the light emitting signal line.

Figure 6C:
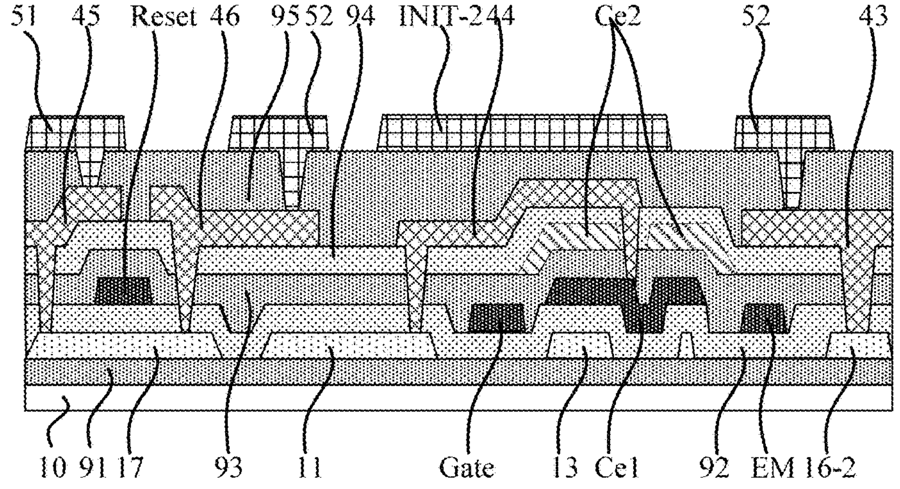
FIG. 6C is a sectional view along an A-A direction in FIG. 6B.
Figure 6D:
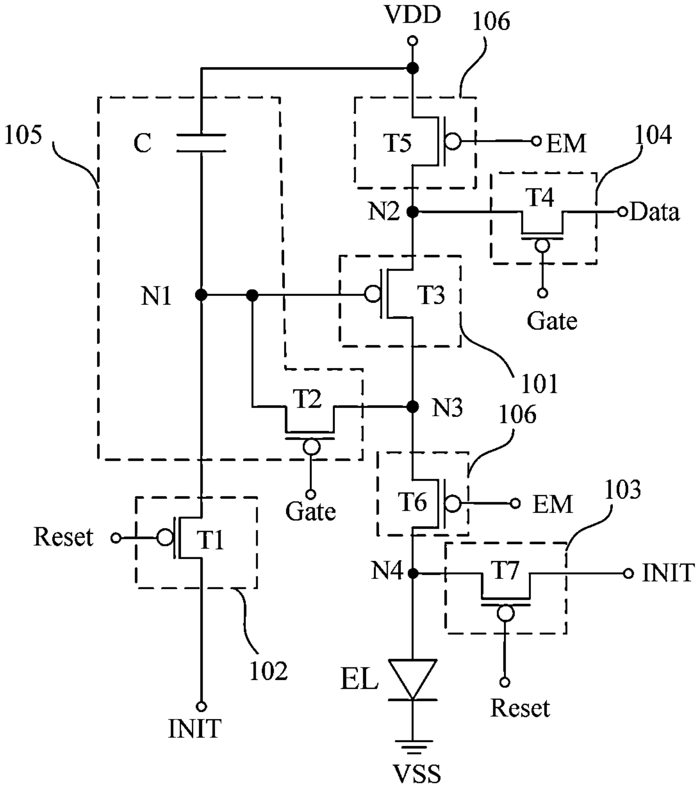
FIG. 6D is another equivalent circuit diagram of a pixel circuit according to an embodiment of the present disclosure.
Figure 6E:
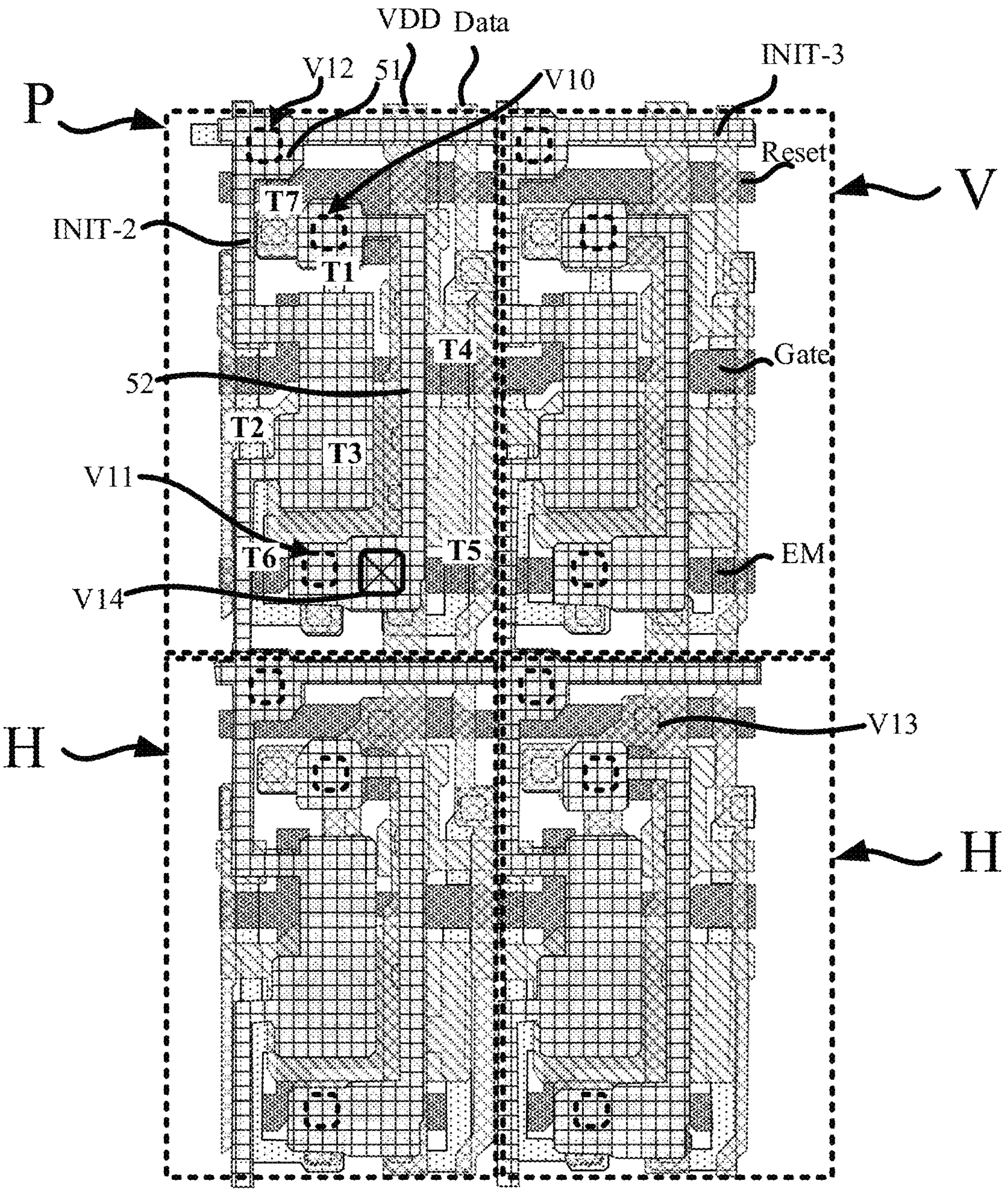
FIG. 6E is a schematic planar view of a display substrate after a fourth conductive layer for the four pixels in a dotted line region in FIG. 5B is formed.

In some exemplary embodiments, as shown in conjunction with FIGS. 6B and 6E, the pixel drive circuit further includes a first light emitting control transistor (i.e., a fifth transistor T5 in FIG. 6B), a second light emitting control transistor (i.e., a sixth transistor T6 in FIG. 6B), and an anode connection electrode 52 connected to a second electrode of the first light emitting control transistor through an anode via hole V14.

The first light emitting control transistor, the anode via hole V14, and the second light emitting control transistor are arranged in a first direction X, and the anode via hole V14 is located between the first light emitting control transistor and the second light emitting control transistor.

In some exemplary embodiments, at least one sub-pixel is divided in the second direction Y into a first region R1, a second region R2, and a third region R3. The first region R1 and the third region R3 are respectively located on two sides of the second region R2, a drive transistor is located in the second region R2, an initial signal line INIT connected to the sub-pixel (where the initial signal line INIT includes a first branch INIT-1 and/or a third branch INIT-3 of the initial signal line, the second branch INIT-2 of the initial signal line crosses the first region R1, the second region R2, and the third region R3) and a reset transistor are located in the first region R1, and a light emitting signal line EM connected to the sub-pixel and a light emitting control transistor are located in the third region R3.

In some exemplary embodiments, the initial signal line includes a first branch INIT-1 extending in the first direction X, the first branch INIT-1 of the initial signal line is disposed in the same layer as the active layers of the multiple transistors.

In this embodiment, by arranging the first branch INIT-1 of the initial signal line in the same layer as the active layers of multiple transistors, the initial signal initializes the first node N1 with the shortest path directly from the top of each sub-pixel through the semiconductor layer, thus effectively utilizing the Layout space of pixels.

In some exemplary embodiments, the pixel drive circuit further includes a storage capacitor C, and both the first reset transistor and the second reset transistor are located between the first branch INIT-1 of the initial signal line and the storage capacitor C within the same sub-pixel.

In some exemplary embodiments, as shown in FIG. 6D, the pixel drive circuit may include seven transistors (first transistor T1 to seventh transistor T7) and one storage capacitor C.

Herein, a gate of the first transistor T1 is connected to the reset signal line Reset, a first electrode of the first transistor T1 is connected to the initial signal line INIT, and a second electrode of the first transistor T1 is connected to a first node N1. A gate of the second transistor T2 is connected to the scan signal line Gate, a first electrode of the second transistor T2 is connected to the fifth node N3, and a second electrode of the second transistor T2 is connected to the first node N1. A gate of the third transistor T3 is connected to a first node N1, a first electrode of the third transistor T3 is connected to a second node N2, and a second electrode of the third transistor T3 is connected to the third node N3. A gate of the fourth transistor T4 is connected to the scan signal line Gate, a first electrode of the fourth transistor T4 is connected to the data signal line Data, and a second electrode of the fourth transistor T4 is connected to the second node N2. A gate of the fifth transistor T5 is connected to the light emitting signal line EM, a first electrode of the fifth transistor T5 is connected to the first power supply line VDD, and a second electrode of the fifth transistor T5 is connected to the second node N2. A gate of the sixth transistor T6 is connected to the light emitting signal line EM, a first electrode of the sixth transistor T6 is connected to the third node N3, and a second electrode of the sixth transistor T6 is connected to the fourth node N4 (i.e., a first electrode of the light emitting device). A gate of the seventh transistor T7 is connected to the reset signal line Reset, a first electrode of the seventh transistor T7 is connected to the initial signal line INIT, and a second electrode of the seventh transistor T7 is connected to the fourth node N4. A first terminal of the storage capacitor C is connected to a first power supply line VDD, and a second terminal of the storage capacitor C is connected to the first node N1.

In some exemplary embodiments, active layers of the multiple transistors each each include a channel region, a first region located on a side of the channel region and corresponding to a source electrode, and a second region located on the other side of the channel region and corresponding to a drain electrode. The first region of the active layer of the first reset transistor, the first region of the active layer of the second reset transistor, and the first branch INIT-1 of the initial signal line are connected to each other as an integrated structure.

In some exemplary embodiments, the active layer of the first reset transistor has an "L" shape, the reset signal line Reset is provided with a first bump 21-1 in each sub-pixel, and a region where the reset signal line Reset and the first bump 21-1 overlap with a channel region of the first reset transistor serve as gate electrodes of the first reset transistor with a double-gate structure.

In some exemplary embodiments, in a plane perpendicular to the display substrate, the display substrate includes a semiconductor layer, a first conductive layer, a second conductive layer, a third conductive layer, and a fourth conductive layer arranged in sequence on a substrate 10, and an insulating layer arranged between the semiconductor layer and the first conductive layer or insulating layers between the respective conductive layers.

The semiconductor layer includes an active layer of multiple transistors and a first branch INIT-1 of the initial signal line, the first conductive layer includes gate electrodes of the multiple transistors, a reset signal line Reset and a first electrode plate Ce1 of a storage capacitor, the second conductive layer includes a second electrode plate Ce2 of the storage capacitor, the third conductive layer includes a second connection electrode 44, and the fourth conductive layer includes a second branch INIT-2 of the initial signal line.

The second connection electrode 44 is configured to connect the gate electrode of the drive transistor and a second region of the first reset transistor through a via hole on an insulating layer, and the second branch INIT-2 of the initial signal line is connected to the first branch INIT-1 of the initial signal line through a via hole on an insulating layer.

An orthographic projection of the second branch INIT-2 of the initial signal line on the substrate 10 at least partially overlaps with an orthographic projection of the second connection electrode 44 on the substrate 10.

In this embodiment, the second branches INIT-2 (located in the fourth conductive layer) of the initial signal line is longitudinally connected to form a mesh, and is wound at the position of the second connection electrode 44 (i.e., the first node N1) to shield the second connection electrode 44. Because the Pitches of the light emitting region and the pixel circuit region are different, the environment above the first node N1 of each pixel circuit is different, so the parasitic capacitance of the first node N1 of each pixel circuit is different. The embodiment of the present disclosure shields the second connection electrode 44 (i.e., the first node N1) through the second branch INIT-2 of the initial signal line, which reduces the influence of the upper layer metal on the first node N1 and optimizes the display effect.

Figure 13:
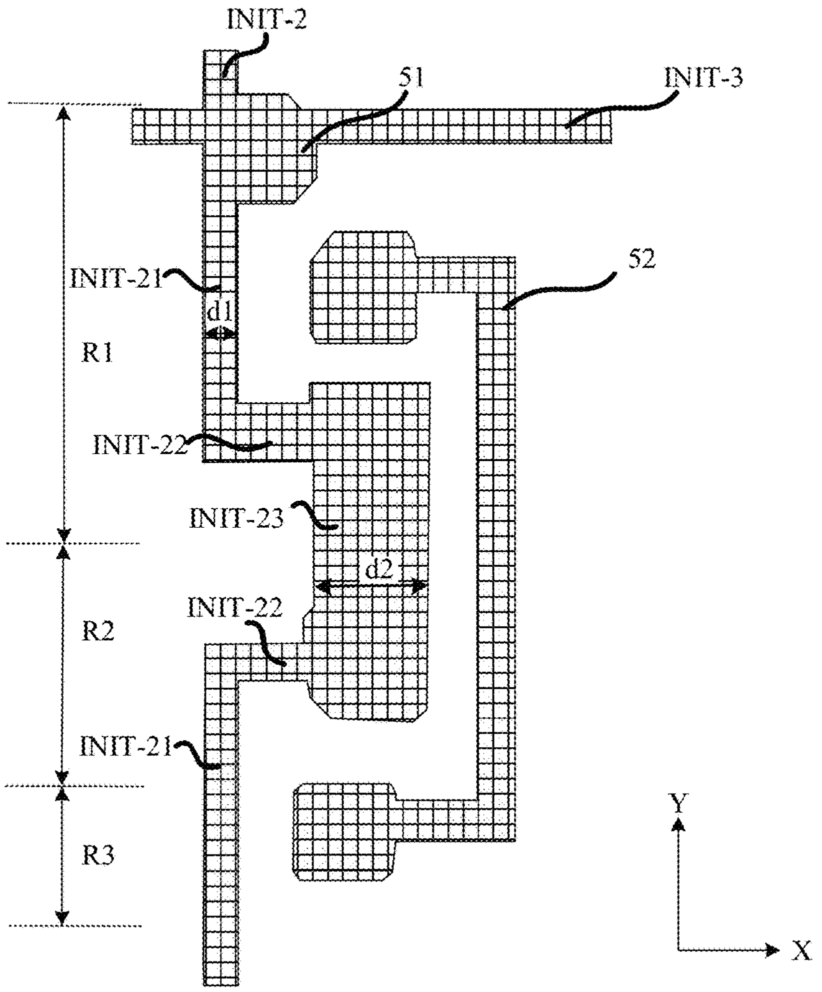
FIG. 13 is a schematic planar view of a fourth conductive layer for a normal pixel.
Figure 14:
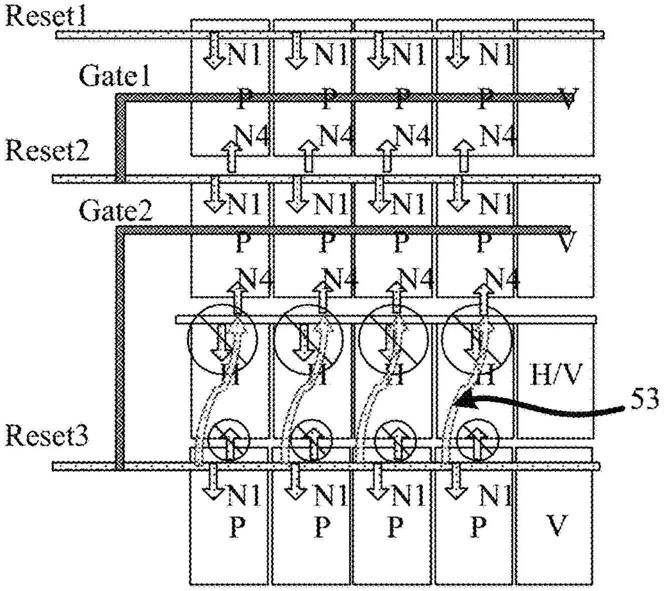
FIG. 14 is a schematic diagram of GOA loading of another display region according to an embodiment of the present disclosure.

In some exemplary embodiments, as shown in FIGS. 6B and 13, the second branch INIT-2 of the initial signal line includes a main body portion INIT-21 extending along a second direction Y and a bent portion including two first extension portions INIT-22 extending along a first direction X and a second extension INIT-23 provided between the two first extensions INIT-22. The second extension INIT-23 extends along a second direction Y, and the first direction X intersects the second direction Y (in an exemplary embodiment, the first direction X and the second direction Y are perpendicular to each other). A width d2 of the second extension portion INIT-23 along the first direction X is greater than a width d1 of the main body portion INIT-21 along the first direction X.

In some exemplary embodiments, the third conductive layer further includes a first power supply line VDD, a first connection electrode 43 and a fourth connection electrode 46, the fourth conductive layer further includes an anode connection electrode 52, and the light emitting control transistor includes a first light emitting control transistor (i.e., a sixth transistor T6 in FIG. 6B or FIG. 6D).

The anode connection electrode 52 connects the first connection electrode 43 and the fourth connection electrode 46 through a via hole on an insulating layer, the first connection electrode connects a second region of the first light emitting control transistor through a via hole on an insulating layer, and the fourth connection electrode 46 connects a second region of the second reset transistor through a via hole on an insulating layer.

An orthographic projection of the anode connection electrode 52 on the substrate at least partially overlaps with an orthographic projection of the first power supply line VDD on the substrate 10.

In this embodiment, the first power supply line VDD shields the anode connection electrode 52 by making the orthographic projection of the anode connection electrode 52 on the substrate 10 at least partially overlap with the orthographic projection of the first power supply line VDD on the substrate 10, thereby reducing the influence of the lower metal on the anode connection electrode 52 and optimizing the display effect.

In some exemplary embodiments, an orthographic projection of the anode connection electrode 52 on the substrate 10 at least partially overlaps with an orthographic projection of the second electrode of the first reset transistor on the substrate 10.

In some exemplary embodiments, as shown in FIGS. 6B and 6E, the display substrate further includes a planarization layer (not shown in the figure), an anode (not shown in the figure), an organic light emitting layer (not shown in the figure), and a cathode (not shown in the figure) that are sequentially disposed on the fourth conductive layer.

The anode is connected to the anode connection electrode 52 through an anode via hole (i.e. a fourteenth via hole V14 in FIG. 6E) on the planarization layer; and the anode via hole is located in the third region R3.

In some exemplary embodiments, the fourth conductive layer further includes a fifth connection electrode 51 and a third branch INIT-3 of the initial signal line.

The third branch INIT-3 of the initial signal line extends in a first direction X, and a second branch INIT-2 of the initial signal line extends in a second direction Y, wherein the first direction X intersects the second direction Y.

The fifth connection electrode 51, the second branch INIT-2 of the initial signal line and the third branch INIT-3 of the initial signal line are connected to each other as an integrated structure. An orthographic projection of the third branch INIT-3 of the initial signal line on the substrate 10 at least partially overlaps with the orthographic projection of the first branch INIT-1 of the initial signal line on the substrate 10.

In this embodiment, the third branch INIT-3 (located in the third conductive layer) of the initial signal line is connected in parallel with the first branch INIT-1 (located in the semiconductor layer) of the initial signal line, to reduce the signal loading of the initial signal line INIT.

Figure 7A:
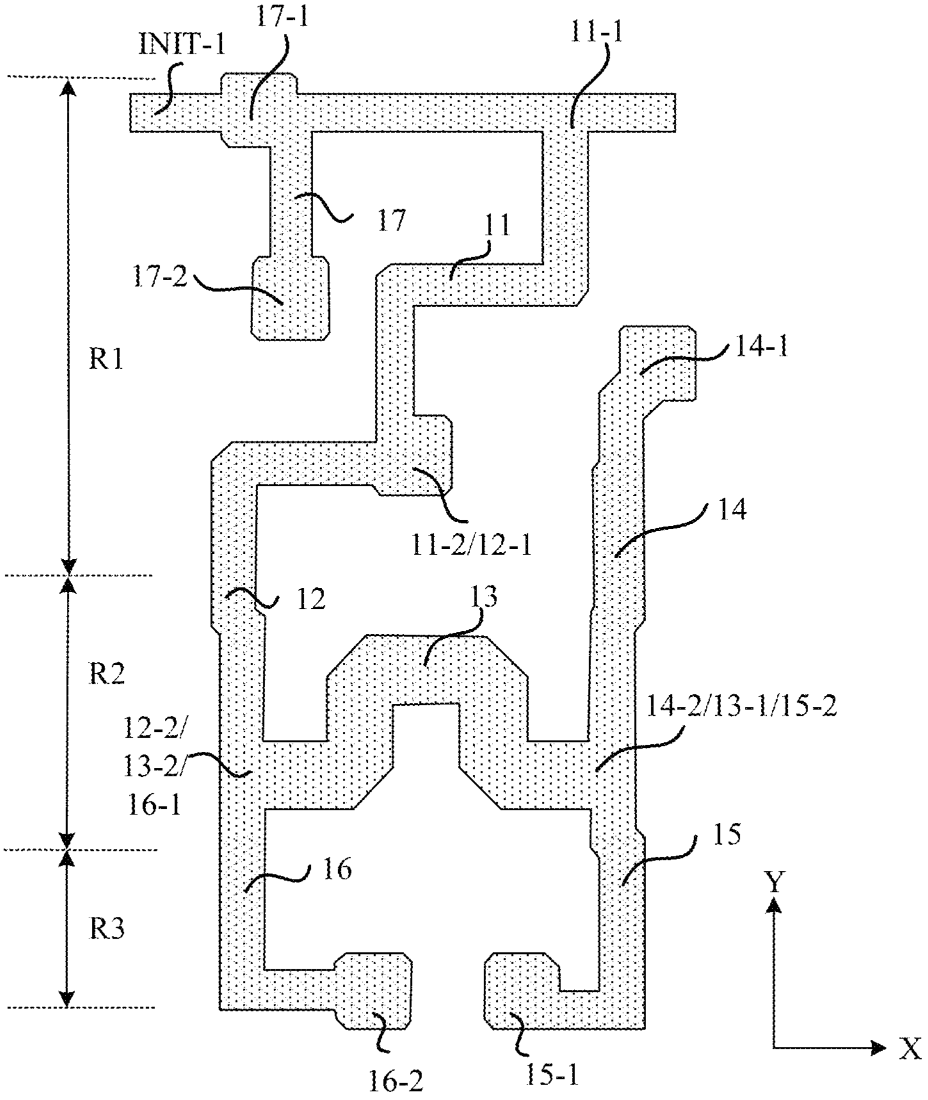
FIG. 7A is a schematic planar view of a semiconductor layer for a normal pixel.
Figure 7B:
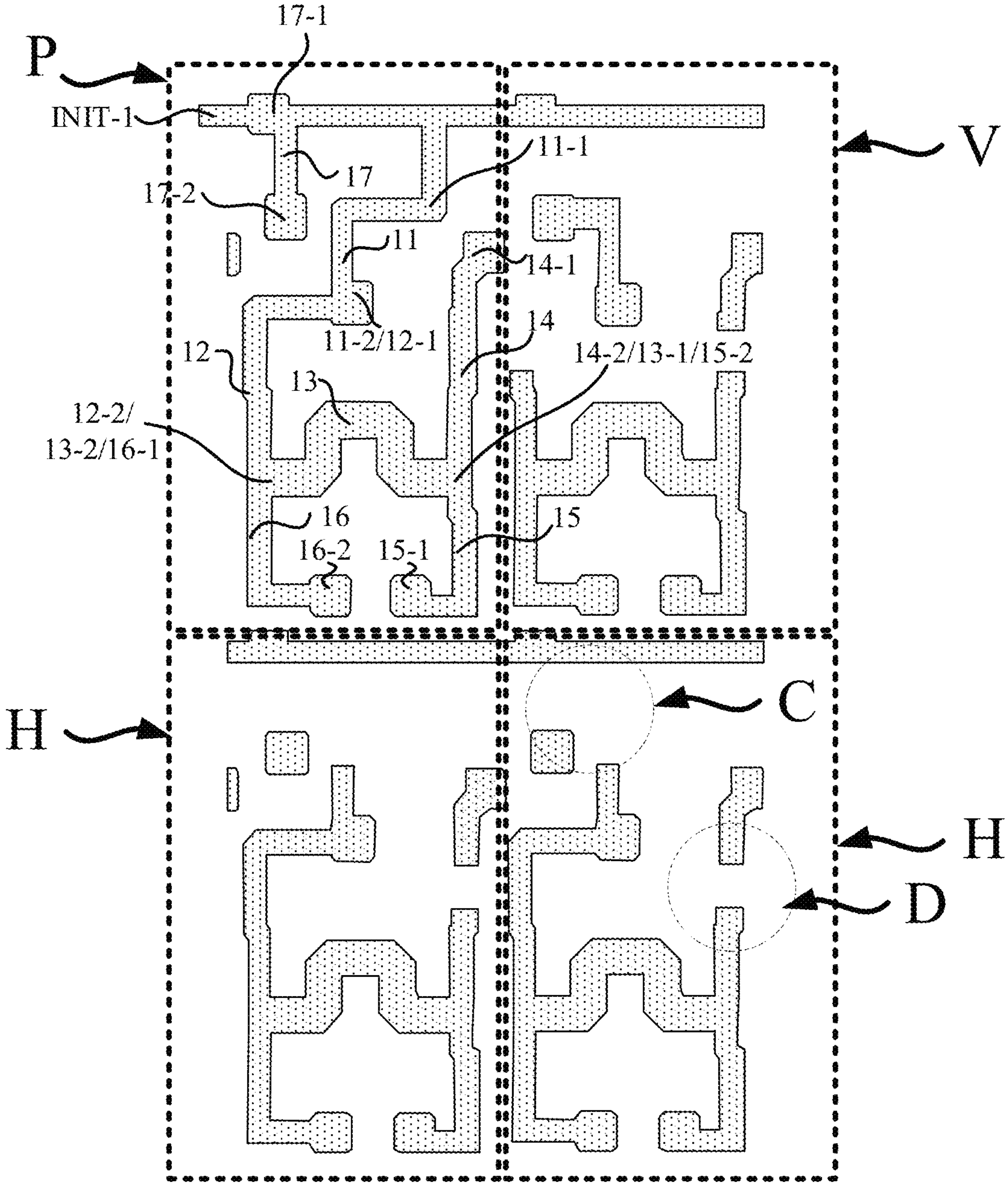
FIG. 7B is a schematic planar view of a display substrate after a semiconductor layer for the four pixels in a dotted line region in FIG. 5B is formed.

In some exemplary embodiments, as shown in FIGS. 6E and 7B, the display substrate further includes a dummy pixel row between multiple sub-pixels, the dummy pixel row includes multiple dummy sub-pixels, the dummy sub-pixel includes a dummy pixel drive circuit including a dummy reset transistor, a dummy data writing transistor, and both a channel region of the dummy reset transistor (i.e., a C region in FIG. 7B) and a channel region of the dummy data writing transistor (i.e., a D region in FIG. 7B) are broken structures.

Figure 8A:
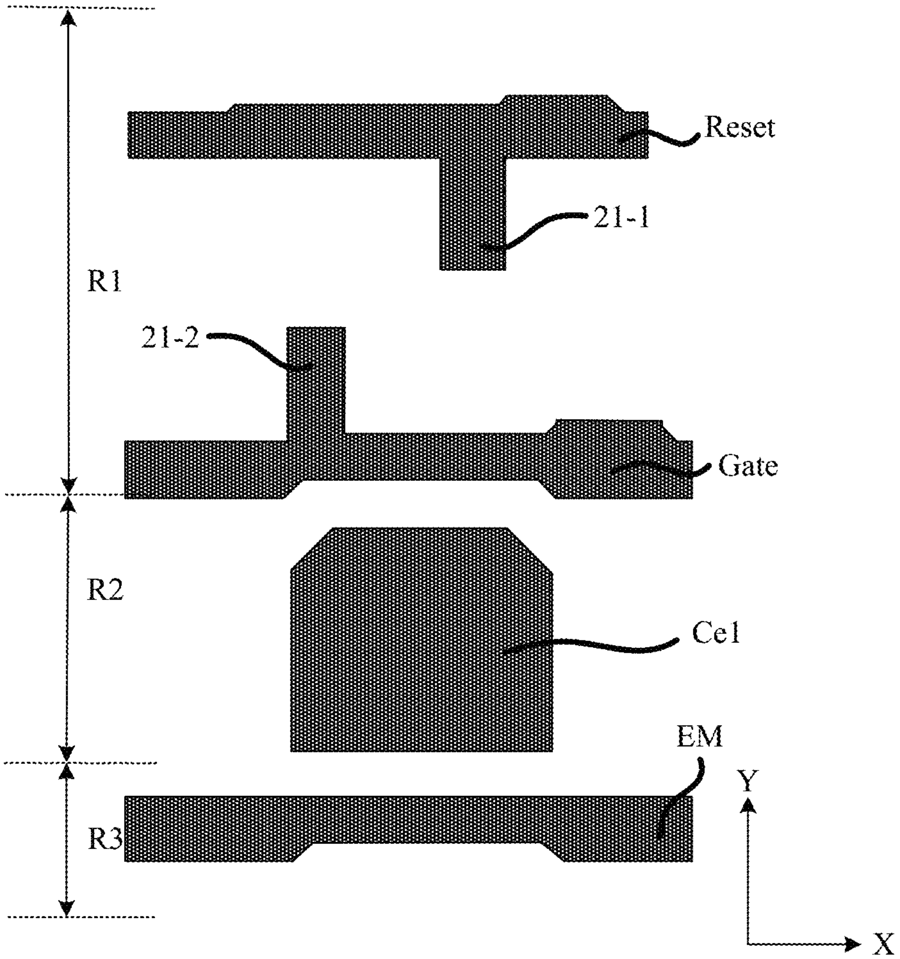
FIG. 8A is a schematic planar view of a first conductive layer for a normal pixel.
Figure 8B:
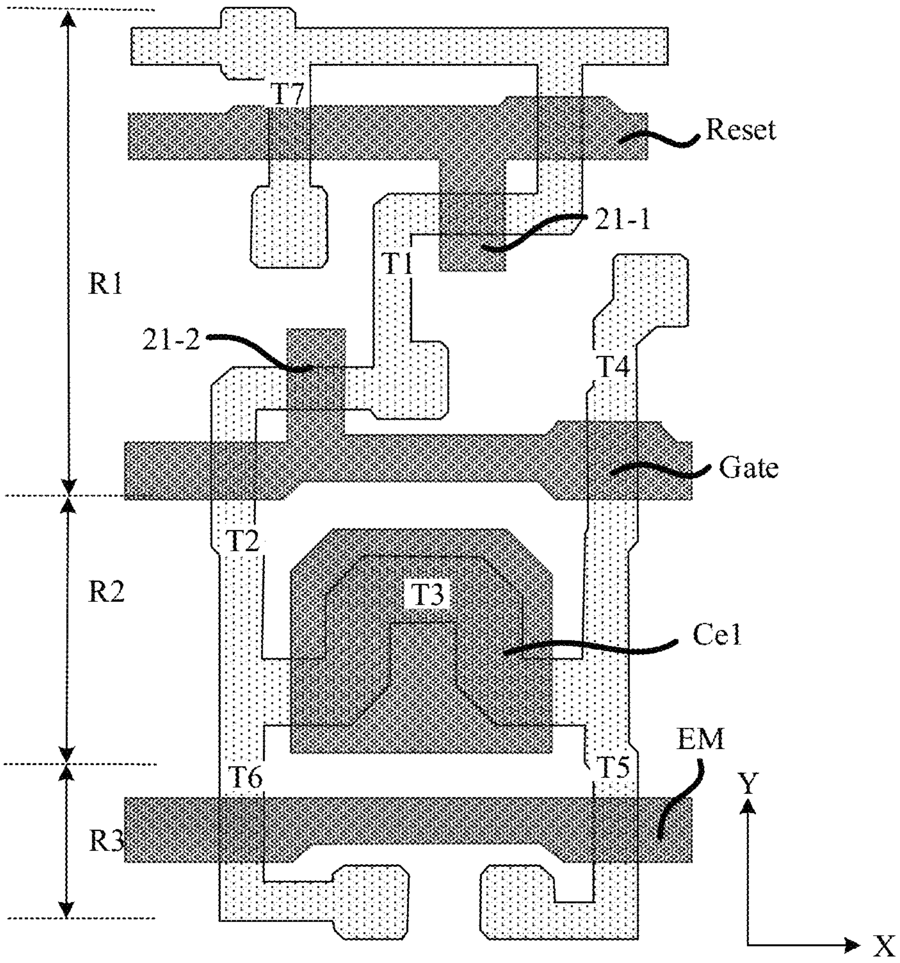
FIG. 8B is a schematic planar view of a display substrate after a first conductive layer for a normal pixel is formed.
Figure 11A:
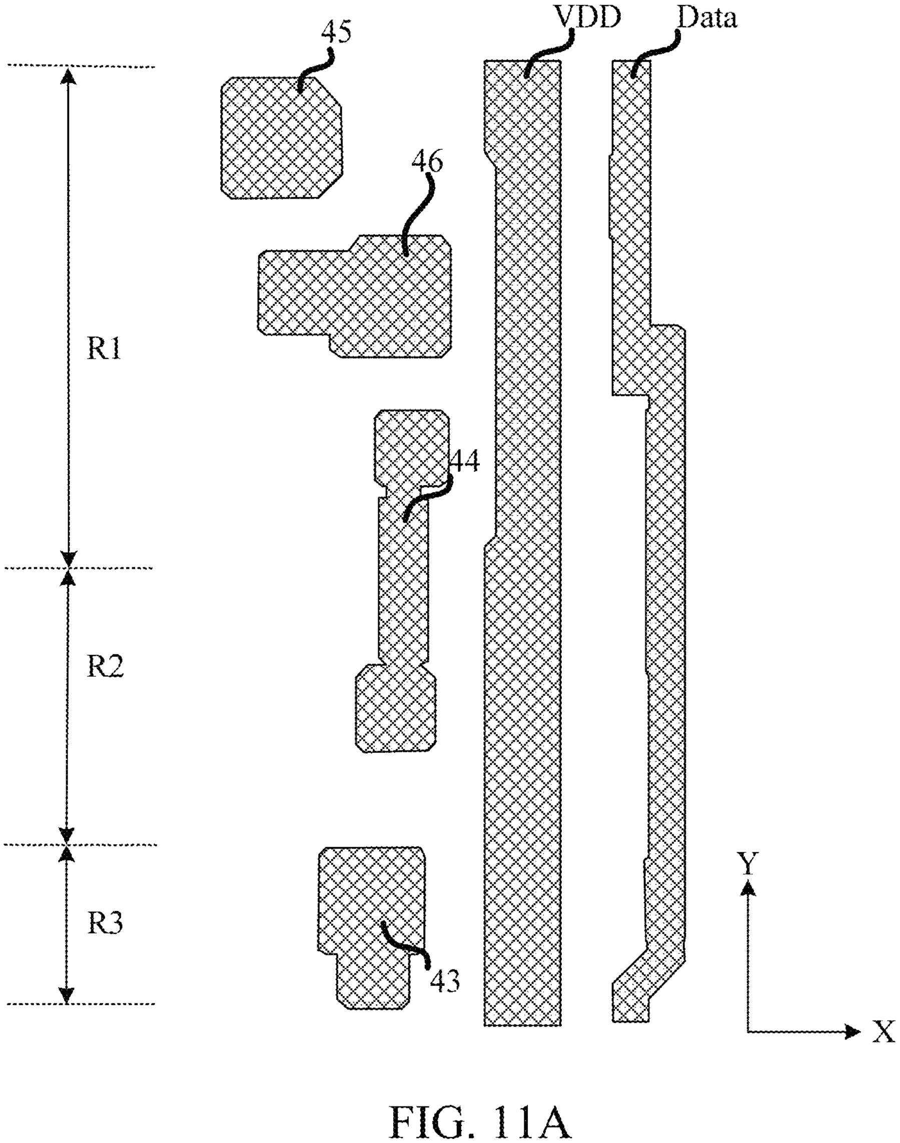
FIG. 11A is a schematic planar view of a third conductive layer for a normal pixel.
Figure 11B:
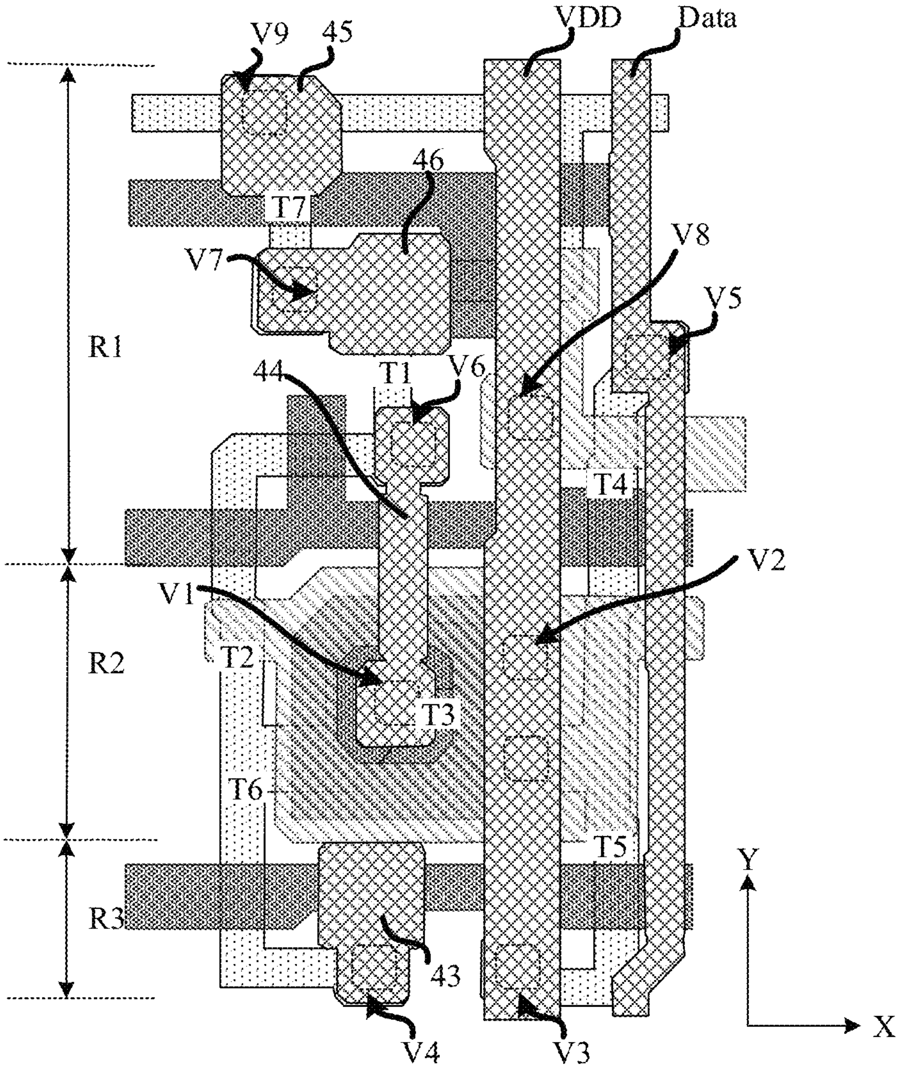
FIG. 11B is a schematic planar view of a display substrate after a third conductive layer for a normal pixel is formed.
Figure 11C:
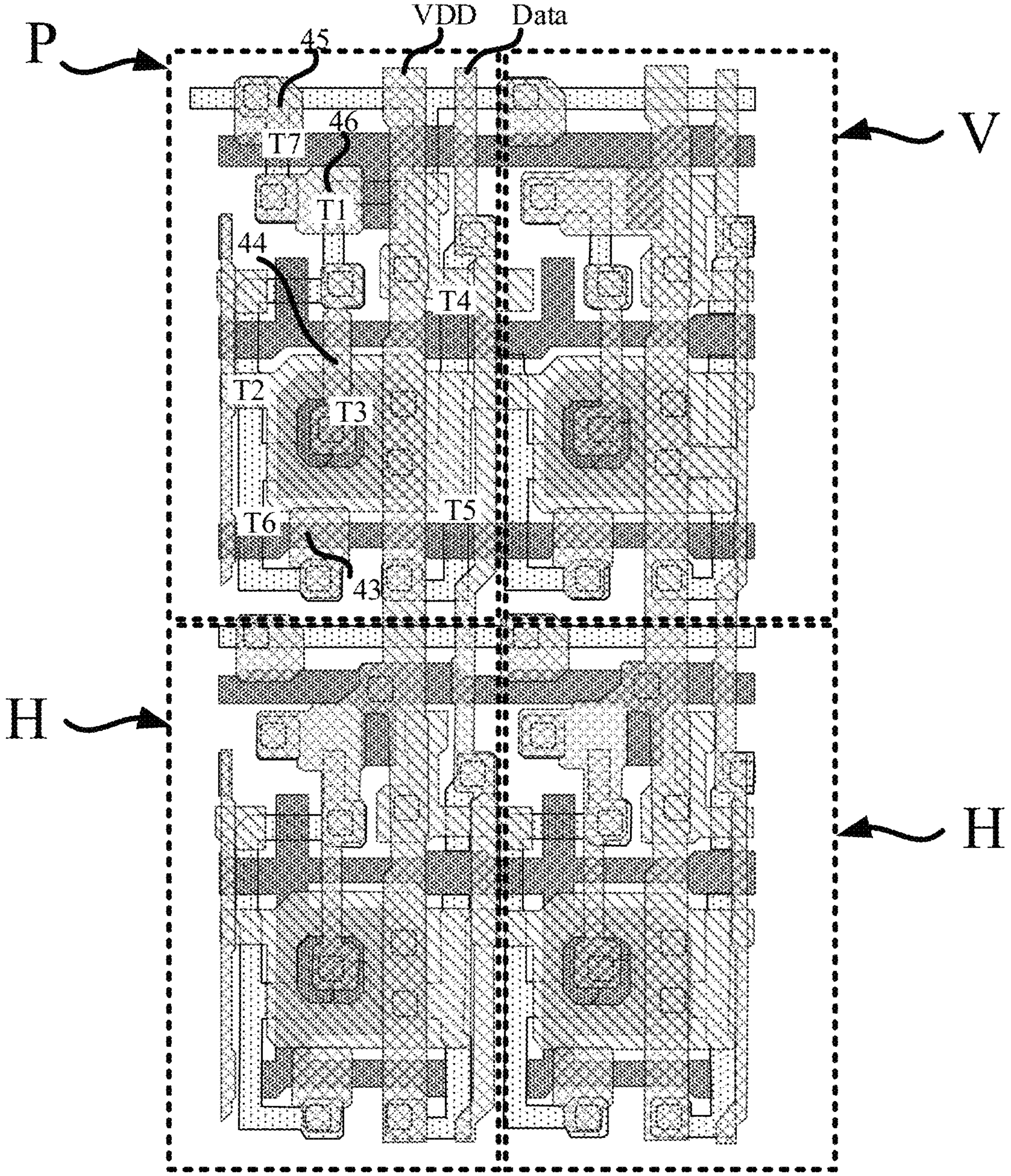
FIG. 11C is a schematic planar view of a display substrate after a third conductive layer for the four pixels in a dotted line region in FIG. 5B is formed.

In some exemplary embodiments, as shown in FIGS. 6E, 8B, and 11C, the dummy pixel drive circuit includes a dummy storage capacitor, a dummy initial signal line, a dummy reset signal line, a dummy light emitting signal line and a dummy scan signal line. The dummy light emitting signal line, a first electrode plate of the dummy storage capacitor and the dummy scan signal line are connected to each other as an integrated structure, the first and second electrode plates of the dummy storage capacitor and the dummy reset signal line are respectively connected to the first power supply line VDD through via holes (i.e., the first via hole V1, the second via hole V2, and the thirteenth via hole V13 in FIG. 6E) on an insulating layer.

In some exemplary embodiments, the dummy reset transistor includes a dummy first transistor and a dummy seventh transistor, a second electrode of the dummy first transistor is connected to the first power supply line VDD through a sixth via hole V6 in the dummy sub-pixel, and a second electrode of the dummy seventh transistor is connected to the first power supply line VDD through a seventh via hole V7 in the dummy sub-pixel.

Exemplary description is made below through a preparation process of a display substrate. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching. The present disclosure is not limited thereto. A "thin film" refers to a layer of thin film made of a certain material on a substrate through a process such as deposition, coating, etc. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process includes at least one "pattern". "A and B being arranged on a same layer" mentioned in the present disclosure means that A and B are formed simultaneously through a same patterning process, and a "thickness" of a film layer is a dimension of the film layer in a direction perpendicular to a display substrate. In an exemplary implementation, of the present disclosure, "an orthographic projection of B is within a range of an orthographic projection of A" refers to a boundary of the orthographic projection of B falling within a range of a boundary of the orthographic projection of A, or a boundary of the orthographic projection of A is coincided with a boundary of the orthographic projection of B. "An orthographic projection of A including an orthographic projection of B" means that a boundary of the orthographic projection of B falls within a range of boundary of the orthographic projection of A, or the boundary of the orthographic projection of A is coincided with the boundary of the orthographic projection of B.

In some exemplary implementations, a preparation process of the display substrate may include the following operations.

(1) In an exemplary embodiment, forming a pattern of a semiconductor layer may include sequentially depositing a first insulating film and a semiconductor film on a substrate 10, patterning the semiconductor film by a patterning process, forming a first insulating layer 91 covering the substrate 10 and a semiconductor layer disposed on the first insulating layer 91, as shown in FIGS. 7A and 7B. FIG. 7A is a schematic planar view of the semiconductor layer for a normal pixel, and FIG. 7B is a schematic planar view of a display substrate after the semiconductor layer for four pixels in the dotted line region in FIG. 5B is formed.

In an exemplary embodiment, the semiconductor layer of each sub-pixel may include a first active layer 11 of the first transistor T1 to a seventh active layer 17 of the seventh transistor T7, and a first branch INIT-1 of the initial signal line, and the first active layer 11 to the seventh active layer 17 and the first branch INIT-1 of the initial signal line are connected to each other as an integrated structure.

In an exemplary embodiment, the first region R1 may include a first branch INIT-1 of the initial signal line, at least portion of those, which are the first active layer 11 of the first transistor T1, a second active layer 12 of the second transistor T2, a fourth active layer 14 of the fourth transistor T4, and a seventh active layer 17 of the seventh transistor T7, the second region R2 may include at least portion of the third active layer 13 of the third transistor T3, and the third region R3 may include at least portion of the fifth active layer 15 of the fifth transistor T5 and the sixth active layer 16 of the sixth transistor T6. The first branch INIT-1 of the initial signal line, the first active layer 11, and the seventh active layer 17 are provided on a side of the first region R1 away from the second region R2, and the second active layer 12 and the fourth active layer 14 are provided on a side of the first region R1 adjacent to the second region R2.

In an exemplary embodiment, the first branch INIT-1 of the initial signal line is disposed on a side of the first active layer 11 of the first transistor T1 away from the second region R2.

In an exemplary embodiment, the first active layer 11 may be in a "Z" shape, the second active layer 12 may be in a "7" shape, the third active layer 13 may be in a shape of a Chinese character "几", the fourth active layer 14 may be in a "l" shape, and the fifth active layer 15, the sixth active layer 16 and the seventh active layer 17 may be in an "L" shape.

In an exemplary embodiment, an active layer of each transistor may include a first region, a second region, and a channel region located between the first region and the second region. In an exemplary embodiment, the first branch INIT-1 of the initial signal line and a first region 11-1 of the first active layer 11 are interconnected to form an integrated structure; the first branch INIT-1 of the initial signal line is further provided with protrusions on both sides of the extending direction thereof which simultaneously serve as a first region 17-1 of the seventh active layer 17. A second region 11-2 of the first active layer 11 also serves as a first region 12-1 of the second active layer 12. A first region 13-1 of the third active layer 13 also serves as a second region 14-2 of the fourth active layer 14 and a second region 15-2 of the fifth active layer 15. A second region 13-2 of the third active layer 13 also serves as a second region 12-2 of the second active layer 12 and a first region 16-1 of the sixth active layer 16. In an exemplary embodiment, a second region 16-2 of the sixth active layer 16, a second region 17-2 of the seventh active layer 17, a first region 14-1 of the fourth active layer 14, and a first region 15-1 of the fifth active layer 15 are provided separately.

Figure 8C:
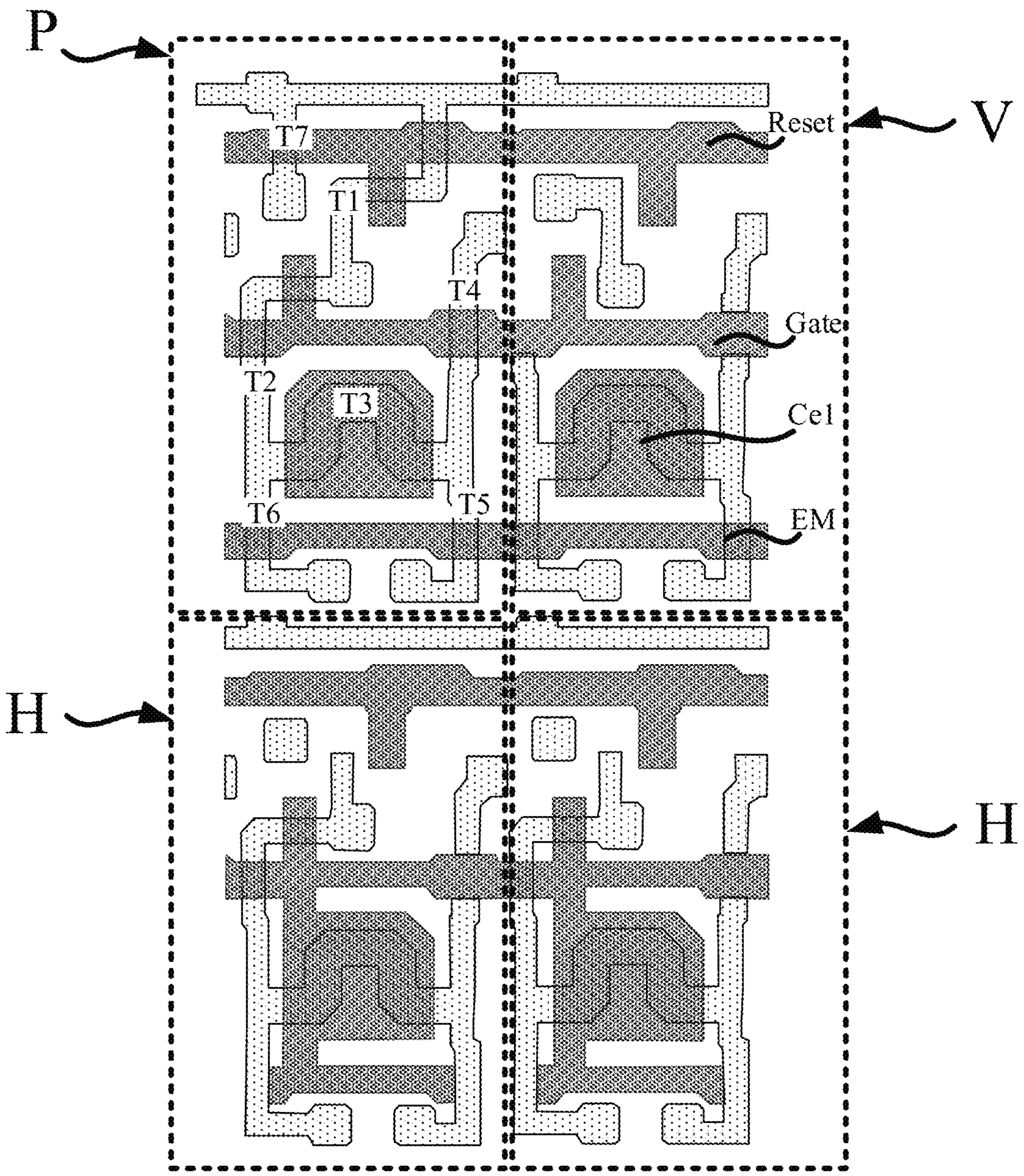
FIG. 8C is a schematic planar view of a display substrate after a first conductive layer for the four pixels in a dotted line region in FIG. 5B is formed.

(2) A pattern of a first conductive layer is formed. In an exemplary embodiment, forming a pattern of a first conductive layer may include: sequentially depositing a second insulating film and a first metal film on a substrate on which the pattern is formed, patterning the first metal film by a patterning process, forming a second insulating layer 92 covering the pattern of a semiconductor layer and the pattern of the first conductive layer disposed on the second insulating layer 92. The pattern of the first conductive layer includes at least a scan signal line Gate, a reset signal line Reset, a light emitting signal line EM, and a first electrode plate Ce1 of a storage capacitor, as shown in FIGS. 8A, 8B, and 8C. FIG. 8A is a schematic planar view of the first conductive layer for a normal pixel, FIG. 8B is a schematic planar view of the display substrate after the first conductive layer for the normal pixel is formed, and FIG. 8C is a schematic planar view of the display substrate after the first conductive layer for the four pixels in the dotted line region of FIG. 5B is formed. In an exemplary embodiment, the first conductive layer may be referred to as a first gate metal (GATE1) layer.

In an exemplary embodiment, the scan signal line Gate, the reset signal line Reset and the light emitting signal line EM extend in the first direction X. The scan signal line Gate and the reset signal line Reset are disposed in the first region R1, the reset signal line Reset is disposed on a side of the scan signal line Gate away from the second region R2, the light emitting signal line EM is disposed in the third region R3, and the first electrode plate Ce1 of the storage capacitor is disposed in the second region R2 between the scan signal line Gate and the light emitting signal line EM.

In an exemplary embodiment, a first electrode plate Ce1 may be rectangular, and rectangle corners may be arranged with chamfers. There is an overlapping region between an orthographic projection of the first electrode plate Ce1 on the substrate 10 and an orthographic projection of a third active layer of a third transistor T3 on the substrate 10. In an exemplary embodiment, a first electrode plate Ce1 also serves as the gate electrode of the third transistor T3.

In an exemplary embodiment, the reset signal line Reset is provided with a first bump 21-1 protruding toward the scan signal line Gate side, an orthographic projection of the first bump 21-1 on the substrate 10 and an orthographic projection of the first active layer of the first transistor T1 on the substrate 10 have an overlapping region. A region where the reset signal line Reset and the first bump 21-1 overlap with the first active layer of the first transistor T1 serves as gate electrodes of the first transistor T1 with a double-gate structure, and a region where the reset signal line Reset overlaps with the seventh active layer of the seventh transistor T7 serves as a gate electrode of the seventh transistor T7. The region where the scan signal line Gate overlaps with the fourth active layer of the fourth transistor T4 serves as the gate electrode of the fourth transistor T4. The scan signal line Gate is provided with a second bump 21-2 projecting toward the reset signal line Reset side. An orthographic projection of the second bump 21-2 on the substrate 10 and an orthographic projection of the second active layer of the second transistor T2 on the substrate 10 have an overlapping region. The region where the scan signal line Gate and the second bump 21-2 overlap with the second active layer of the second transistor T2 serves as gate electrodes of the second transistor T2 with the double-gate structure. The region where the light emitting signal line EM overlaps with the fifth active layer of the fifth transistor T5 serves as the gate electrode of the fifth transistor T5, and the region where the light emitting signal line EM overlaps with the sixth active layer of the sixth transistor T6 serves as the gate electrode of the sixth transistor T6.

In an exemplary embodiment, after the pattern of the first conductive layer is formed, the semiconductor layer may be subjected to a conductive treatment by using the first conductive layer as a shield. A region of the semiconductor layer, which is shielded by the first conductive layer, forms channel regions of the first transistor T1 to the seventh transistor T7, and a region of the semiconductor layer, which is not shielded by the first conductive layer, is made to be conductive, that is, first regions and second regions of the first active layer to the seventh active layer are all made to be conductive.

After this process, the display substrate includes a first insulating layer 91 provided on the substrate 10, a semiconductor layer provided on the first insulating layer 91, a second insulating layer 92 covering the semiconductor layer, and a first conductive layer provided on the second insulating layer 92. The semiconductor layer may include the first branch INIT-1 of the initial signal line, the first active layer 11 to the seventh active layer 17, and the first conductive layer may include the scan signal line Gate, the reset signal line Reset, the light emitting signal line EM, and the first electrode plate Ce1 of the storage capacitor.

Figure 9A:
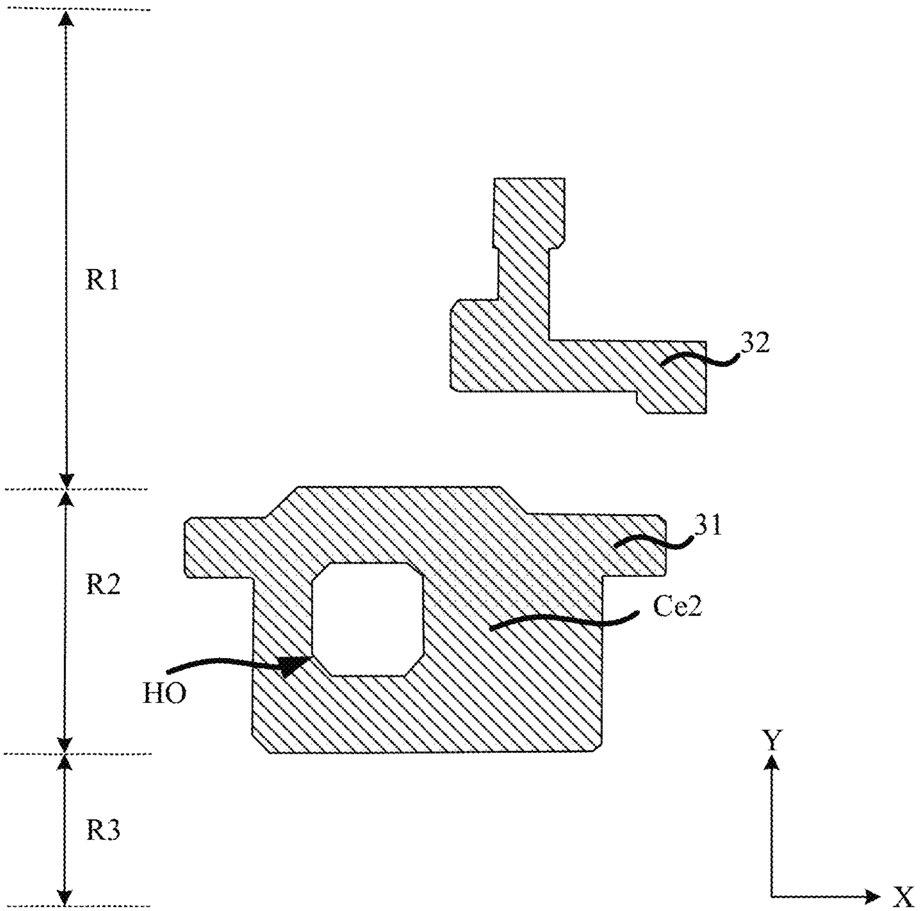
FIG. 9A is a schematic planar view of a second conductive layer for a normal pixel.
Figure 9B:
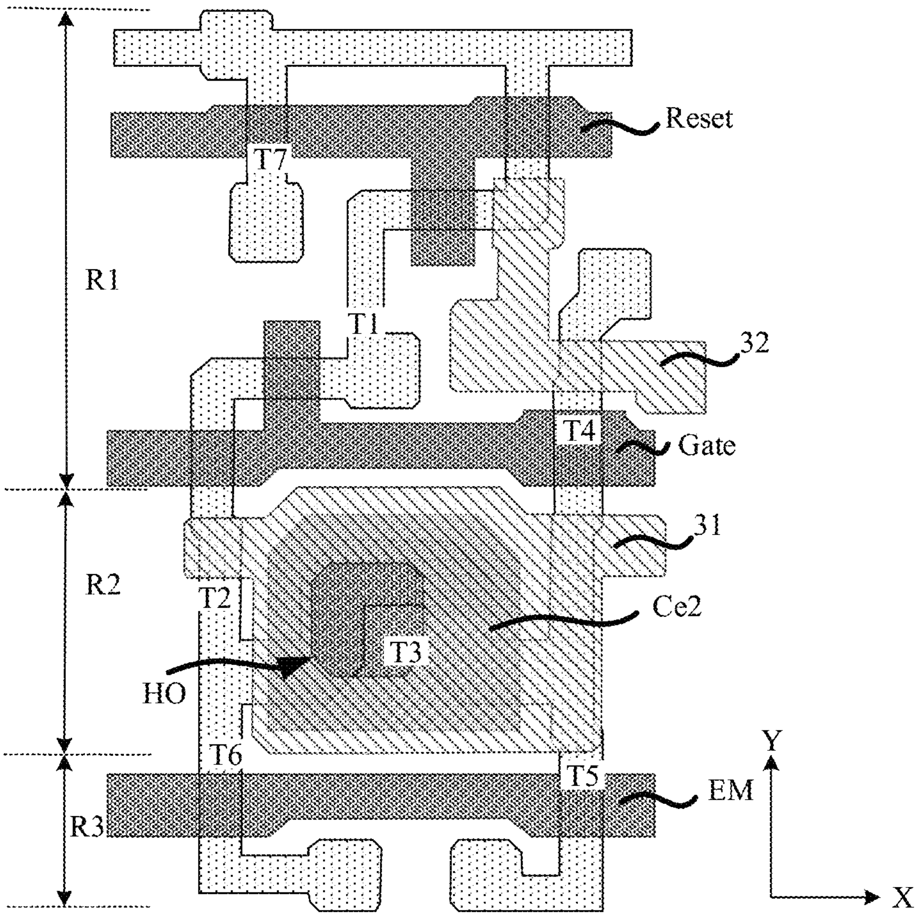
FIG. 9B is a schematic planar view of a display substrate after a second conductive layer for a normal pixel is formed.
Figure 9C:
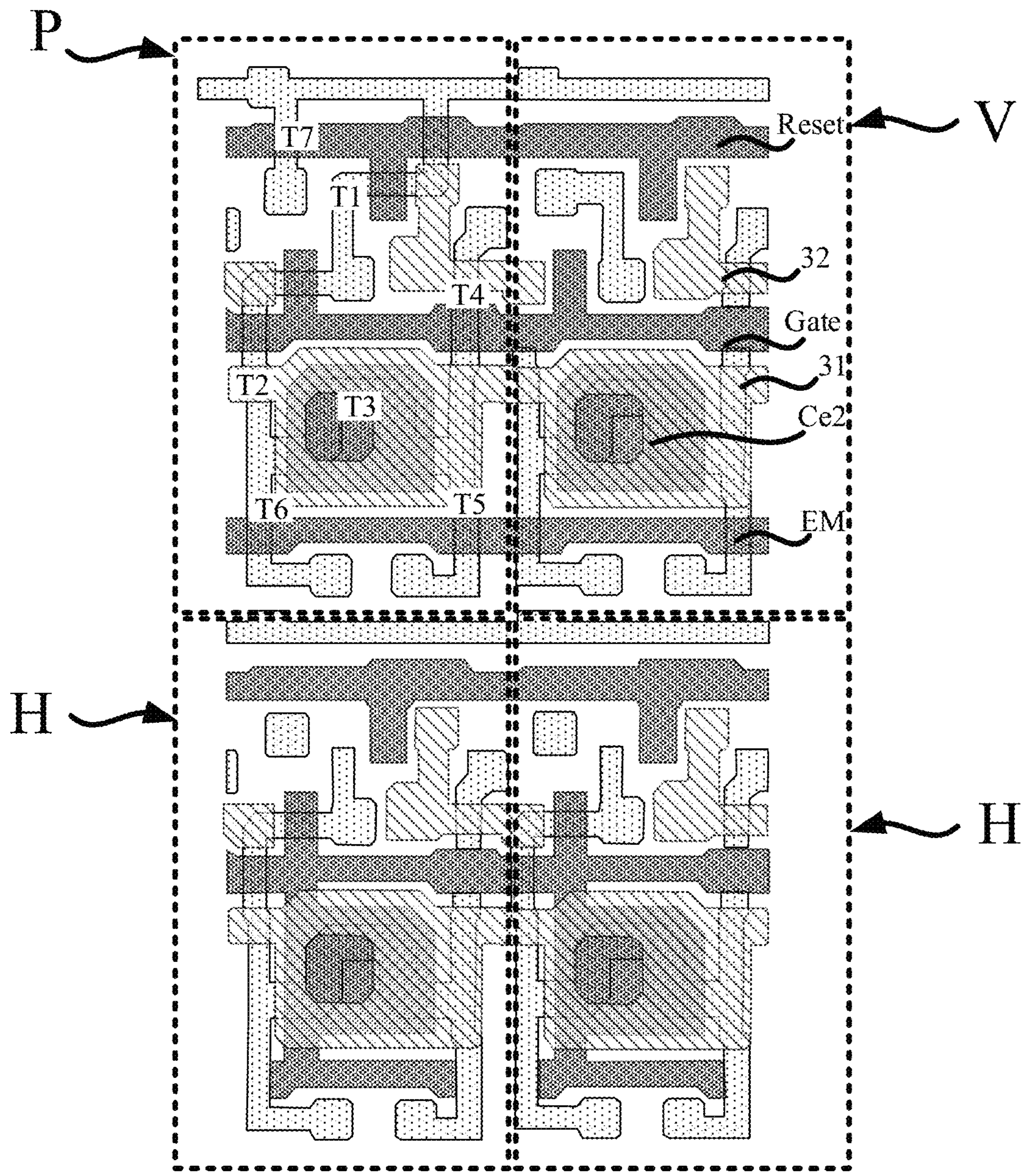
FIG. 9C is a schematic planar view of a display substrate after a second conductive layer for the four pixels in a dotted line region in FIG. 5B is formed.

(3) A pattern of a second conductive layer is formed. In an exemplary embodiment, forming a pattern of a second conductive layer may include: sequentially depositing a third insulating film and a second metal film on a substrate on which the pattern is formed, patterning the second metal film using a patterning process, forming a third insulating layer 93 covering the first conductive layer and the pattern of the second conductive layer disposed on the third insulating layer 93. The pattern of the second conductive layer includes at least a second electrode plate Ce2 of a storage capacitor, a shield electrode 32, and an electrode plate connection line 31, as shown in FIGS. 9A and 9B. FIG. 9A is a schematic planar view of the second conductive layer for a normal pixel, FIG. 9B is a schematic planar view of the display substrate after the second conductive layer for the normal pixel is formed, and FIG. 9C is a schematic planar view of the display substrate after the second conductive layer for the four pixels in the dotted line region in FIG. 5B is formed. In an exemplary embodiment, the second conductive layer may be referred to as a second gate metal (GATE2) layer.

In an exemplary embodiment, the second electrode plate Ce2 of the storage capacitor is disposed within the second region R2 between the scan signal line Gate and the light emitting signal line EM. The shield electrode 32 is arranged in the first region R1. The shield electrode 32 is configured to shield impact of data voltage jump on a critical node, thereby preventing impact of data voltage jump on a potential of a critical node of the pixel drive circuit, and improving the display effect.

In an exemplary embodiment, an outline of the second electrode plate Ce2 may be in a shape of a rectangle, and corners of the rectangle may be chamfered. There is a region where an orthographic projection of the second electrode plate Ce2 on the substrate 10 is overlapped with the orthographic projection of the first electrode plate Ce1 on the substrate 10. The second electrode plate Ce2 is provided with an opening HO, and the opening HO may be located in the middle of the second region R2. The opening HO may be in a shape of a rectangle, so that the second electrode plate Ce2 is in an annular structure. The opening HO exposes the third insulating layer covering the first electrode plate Ce1, and the orthographic projection of the first electrode plate Ce1 on the substrate 10 contains an orthographic projection of the opening HO on the substrate 10. In an exemplary embodiment, the opening HO is configured to accommodate a first via hole that is formed later. The first via hole is located in the opening HO and exposes the first electrode plate Ce1, so that a second connection electrode 44 that is formed later is connected to the first electrode plate Ce1.

In an exemplary embodiment, the electrode plate connection line 31 is disposed between second electrode plates Ce2 of adjacent sub-pixels along the first direction X, a first terminal of the electrode plate connection line 31 is connected to the second electrode plate Ce2 of the present sub-pixel, and a second terminal of the electrode plate connection line 31 extends along the first direction X or an opposite direction of the first direction X, and is connected to the second electrode plates Ce2 of the adjacent sub-pixels, that is, the electrode plate connection line 31 is configured to make the second electrode plates of the adjacent sub-pixels in the first direction X be connected to each other. In an exemplary embodiment, second electrode plates in a sub-pixel row form an integrated structure connected to each other through the electrode plate connection line 31, and the second electrode plates in the integrated structure may be reused as a power supply signal line, thus ensuring that multiple second electrode plates in a sub-pixel row have a same potential, which is beneficial to improving uniformity of the panel, avoiding a poor display of the display substrate, and ensuring a display effect of the display substrate.

In an exemplary embodiment, an orthographic projection of an edge of the second electrode plate Ce2 adjacent to the first region R1 on the substrate 10 is overlapped with an orthographic projection of a boundary line of the first region R1 and the second region R2 on the substrate 10; an orthographic projection of an edge of the second electrode plate Ce2 adjacent to the third region R3 on the substrate 10 is overlapped with an orthographic projection of a boundary line of the second region R2 and the third region R3 on the substrate 10, that is, a length of the second electrode plate Ce2 is equal to a length of the second region R2, and the length of the second electrode plate Ce2 refers to a dimension of the second electrode plate Ce2 in the second direction Y.

After this process, the display substrate includes the first insulating layer 91 arranged on the substrate 10, the semiconductor layer arranged on the first insulating layer 91, the second insulating layer 92 covering the semiconductor layer, the first conductive layer arranged on the second insulating layer 92, the third insulating layer 93 covering the first conductive layer and the second conductive layer arranged on the third insulating layer 93. The semiconductor layer may include the first active layer 11 to the seventh active layer 17. The first conductive layer may include the scan signal line Gate, the reset signal line Reset, the light emitting signal line EM and the first electrode plate Ce1 of a storage capacitor. The second conductive layer may include the second electrode plate Ce2 of the storage capacitor, the shield electrode 32 and the electrode plate connection line 31.

Figure 10A:
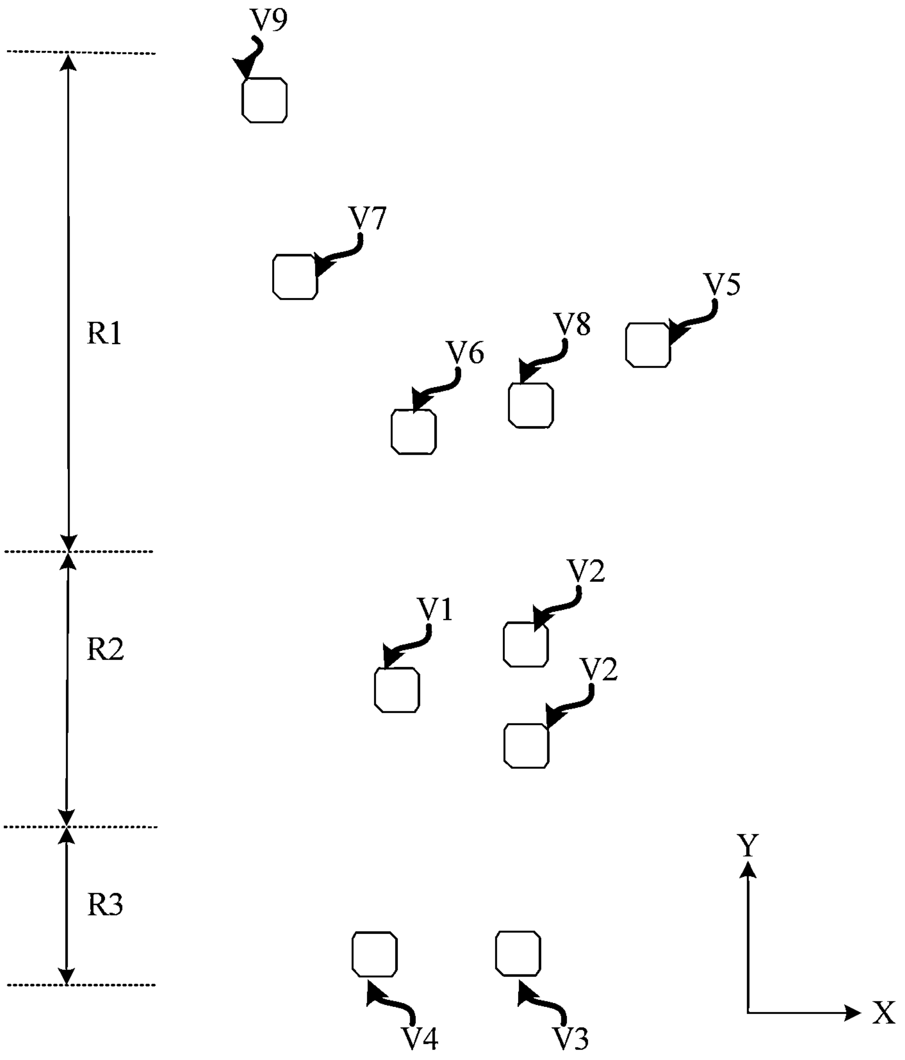
FIG. 10A is a schematic planar view of a fourth insulating layer 94 for a normal pixel.
Figure 10B:
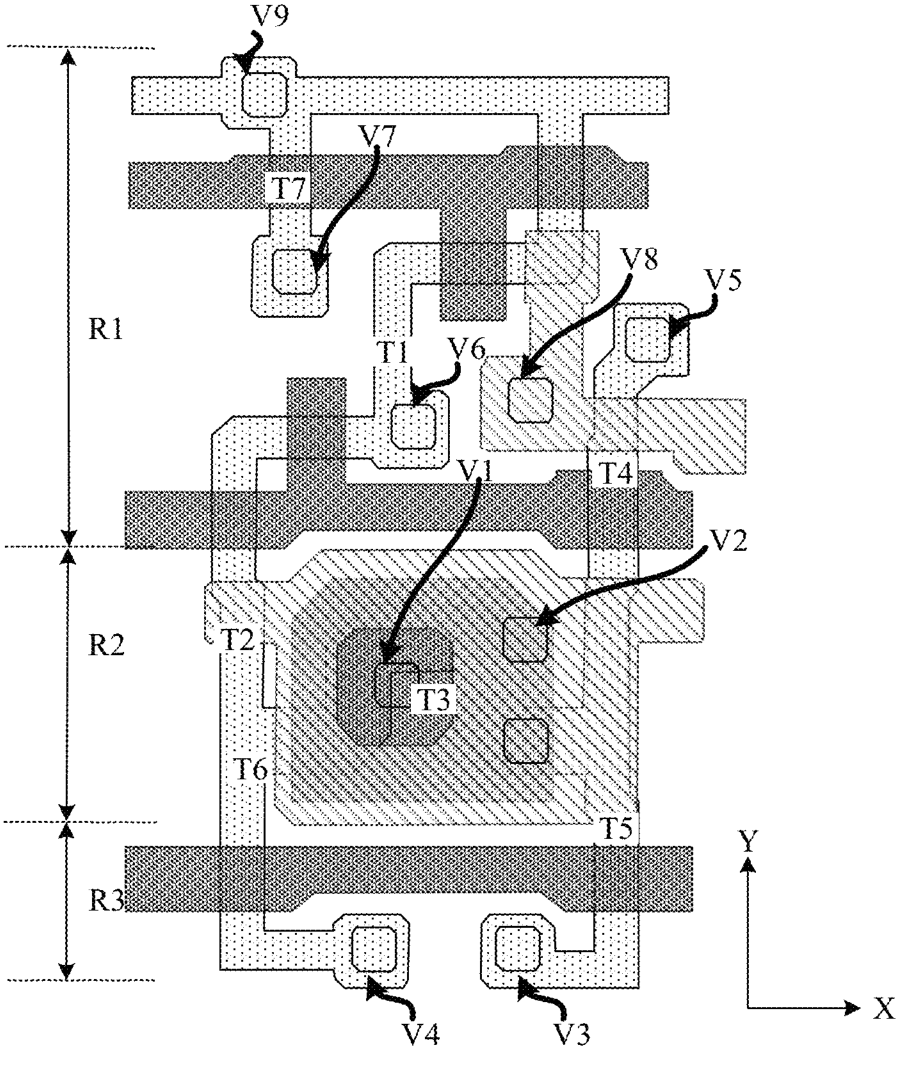
FIG. 10B is a schematic planar view of a display substrate after a fourth insulating layer 94 for a normal pixel is formed.
Figure 10C:
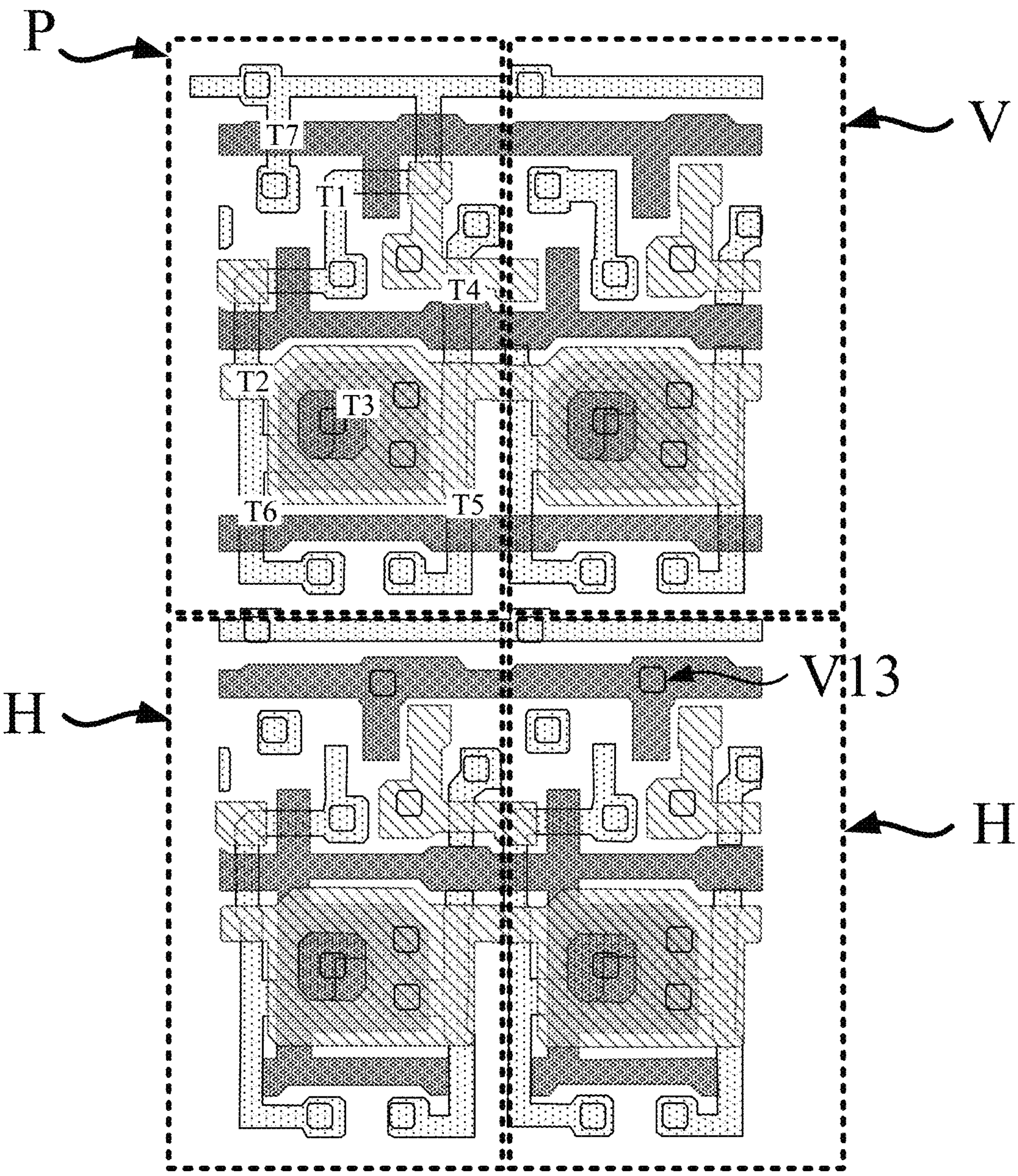
FIG. 10C is a schematic planar view of a display substrate after a fourth insulating layer 94 for the four pixels in a dotted line region in FIG. 5B is formed.

(4) A pattern of a fourth insulating layer 94 is formed. In an exemplary embodiment, forming a pattern of a fourth insulating layer may include: depositing a fourth insulating film on a substrate on which the aforementioned patterns are formed, patterning the fourth insulating film using a patterning process, forming the fourth insulating layer 94 covering the second conductive layer, providing multiple via holes on the fourth insulating layer 94, which include: a first via hole V1, a second via hole V2, a third via hole V3, a fourth via hole V4, a fifth via hole V5, a sixth via hole V6, a seventh via hole V7, an eighth via hole V8 and a ninth via hole V9, as shown in FIGS. 10A, 10B and 10C. FIG. 10A is a schematic planar view of a fourth insulating layer 94 for a normal pixel, FIG. 10B is a schematic planar view of a display substrate after a fourth insulating layer 94 for a normal pixel is formed, and FIG. 10C is a schematic planar view of the display substrate after the fourth insulating layer 94 for the four pixels in the dotted line region in FIG. 5B is formed.

In an exemplary embodiment, the first via hole V1 is located in the opening HO of the second electrode plate Ce2, and an orthographic projection of the first via hole V1 on the substrate 10 is located within a range of the orthographic projection of the opening HO on the substrate. The fourth insulating layer and the third insulating layer in the first via hole V1 are etched off to expose a surface of the first electrode plate Ce1. The first via hole V1 is arranged such that the second connection electrode 44 that is formed later is connected to the first electrode plate Ce1 through this via hole.

In an exemplary embodiment, the second via hole V2 is located in a region where the second electrode plate Ce2 is located, and an orthographic projection of the second via hole V2 on the substrate 10 is within a range of the orthographic projection of the second electrode plate Ce2 on the substrate 10. The fourth insulation layer in the second via hole V2 is etched off to expose a surface of the second electrode plate Ce2. The second via hole V2 is arranged such that the first power supply line that is formed later is connected to the second electrode plate Ce2 through the via hole. In an exemplary embodiment, the second via hole V2 served as a power supply via hole may be multiple via holes, and the multiple second via holes V2 may be sequentially arranged along the second direction Y, thereby increasing the connection reliability between the first power supply line and the second electrode plate Ce2.

In an exemplary embodiment, the third via hole V3 is located in the third region R3, and the fourth insulating layer, the third insulating layer, and the second insulating layer in the third via hole V3 are etched off to expose a surface of the first region of the fifth active layer. The third via hole V3 is arranged such that the first power supply line that is formed later is connected to the fifth active layer through the via hole.

In an exemplary embodiment, the fourth via hole V4 is located in the third region R3, the fourth insulating layer, the third insulating layer and the second insulating layer in the fourth via hole V4 are etched off to expose a surface of the second region of the sixth active layer. The fourth via hole V4 is arranged such that a second electrode of the sixth transistor T6 that is formed later is connected to the sixth active layer through the via hole.

In an exemplary embodiment, the fifth via hole V5 is located in the first region R1, and the fourth insulating layer, the third insulating layer, and the second insulating layer in the fifth via hole V5 are etched off to expose a surface of a first region of the fourth active layer. The fifth via hole V5 is arranged such that a data signal line that is formed later is connected to the fourth active layer through the via hole. Herein the fifth via hole V5 is referred to as a data writing hole.

In an exemplary embodiment, the sixth via hole V6 is located in the first region R1, and the fourth insulating layer, the third insulating layer, and the second insulating layer in the sixth via hole V6 are etched off to expose a surface of a second region of the first active layer (i.e., a first region of the second active layer). The sixth via hole V6 is arranged such that a second electrode of the first transistor T1 that is formed later is connected to the first active layer through the via hole, and a first electrode of the second transistor T2 that is formed later is connected to the second active layer through the via hole.

In an exemplary embodiment, the seventh via hole V7 is located in the first region R1, and the fourth insulating layer, the third insulating layer, and the second insulating layer in the seventh via hole V7 are etched off to expose a surface of a second region of the seventh active layer. The seventh via hole V7 is arranged such that the fourth connection electrode 46 that is formed later is connected with the seventh active layer through this via hole.

In an exemplary embodiment, the eighth via hole V8 is located in the first region R1, and the fourth insulating layer in the eighth via hole V8 is etched off to expose a surface of the shield electrode 32. The eighth via hole V8 is arranged such that the first power supply line that is formed later is connected to the shield electrode 32 through this via hole.

In an exemplary embodiment, the ninth via hole V9 is located in the first region R1, and a fourth insulating layer in the ninth via hole V9 is etched away to expose a surface of the first region of the seventh active layer (that is, the initial signal line 31). The ninth via hole V9 is arranged such that the third connection electrode 45 that is formed later is connected with the first region of the seventh active layer (i.e., the initial signal line 31) through the via hole.

In an exemplary embodiment, as shown in FIG. 10C, the fourth insulating layer 94 is further provided with a thirteenth via hole V13, the thirteenth via hole V13 is located on the reset signal line Reset in the dummy pixel row, the fourth insulating layer and the third insulating layer in the thirteenth via hole V13 are etched away to expose a surface of the reset signal line Reset in the dummy pixel row. The thirteenth via hole V13 is arranged such that the first power supply line VDD that is formed later is connected with the reset signal line Reset in the dummy pixel row through the via hole.

(5) A pattern of a third conductive layer is formed. In an exemplary embodiment, forming the third conductive layer may include: depositing a third metal film on a substrate on which the pattern is formed, patterning the third metal film using a patterning process, forming a third conductive layer disposed on the fourth insulating layer 94. The third conductive layer includes at least the first power supply line VDD, the data signal line Data, the first connection electrode 43, the second connection electrode 44, the third connection electrode 45, and the fourth connection electrode 46, as shown in FIGS. 11A, 11B, and 11C. FIG. 11A is a schematic planar view of the third conductive layer for a normal pixel, FIG. 11B is a schematic planar view of the display substrate after the third conductive layer for the normal pixel is formed, and FIG. 11C is a schematic planar view of the display substrate after the third conductive layer for the four pixels in the dotted line region in FIG. 5B is formed. In an exemplary embodiment, the third conductive layer may be referred to as a first source-drain metal layer (SD1).

In an exemplary embodiment, the first power supply line VDD extends in the second direction Y. On one aspect, the first power supply line VDD is connected to the second electrode plate Ce2 through the second via hole V2, and on another aspect, connected to the shield electrode 32 through the eighth via hole V8, and on still another aspect, connected to the fifth active layer through the third via hole V3, so that the shield electrode 32 and the second electrode plate Ce2 have a same potential as the first power supply line VDD. Since there is an overlapping region between an orthographic projection of the shield electrode 32 on the substrate 10 and an orthographic projection of the data signal line that is formed later on the substrate 10, and the shield electrode 32 is connected to the first power supply line VDD, the impact of data voltage jump on a critical node is effectively shielded, thus preventing the data voltage jump from affecting the potential of the critical node of the pixel drive circuit, and improving the display effect.

In an exemplary embodiment, the data signal line Data extends in the second direction Y, and the data signal line Data is connected to the first region of the fourth active layer through the fifth via hole V5, so that a data signal transmitted by the data signal line Data is written into the fourth transistor T4.

In an exemplary embodiment, the first connection electrode 43 is connected to the second region of the sixth active layer through the fourth via hole V4. In an exemplary embodiment, the first connection electrode 43 may serve as the second electrode of the sixth transistor T6. In an exemplary embodiment, the first connection electrode 43 is configured to be connected to an anode connection electrode that is formed later.

In an exemplary embodiment, the second connection electrode 44 extends in the second direction Y. A first terminal of the second connection electrode 44 is connected to the second region of the first active layer (which is also the first region of the second active layer) through the sixth via hole V6, and a second terminal of the second connection electrode 44 is connected to the first electrode plate Ce1 through the first via hole V1, so that the first electrode plate Ce1, the second electrode of the first transistor T1 and the first electrode of the second transistor T2 have the same potential. In an exemplary embodiment, the second connection electrode 44 may serve as the second electrode of the first transistor T1 and the first electrode of the second transistor T2.

In the exemplary embodiment, the third connection electrode 45 is connected to the first region of the seventh active layer through the ninth via hole V9. Since the first region of the seventh active layer, the first region of the first active layer and the initial signal line 31 are in an integrated structure connected to each other, the third connection electrode 45 is connected to the initial signal line 31, so that the first electrode of the seventh transistor T7 and the first electrode of the first transistor T1 have the same potential as the initial signal line 31. In an exemplary embodiment, the third connection electrode 45 may serve as the first electrode of the seventh transistor T7 and the first electrode of the first transistor T1.

In an exemplary embodiment, the fourth connection electrode 46 is connected to the second region of the seventh active layer through the via hole V7. In an exemplary embodiment, the fourth connection electrode 46 may serve as the second electrode of the seventh transistor T7. In an exemplary embodiment, the fourth connection electrode 46 is configured to be connected to an anode connection electrode that is formed later.

In an exemplary embodiment, the first power supply line VDD includes a third bump within the dummy pixel row, the third bump may be irregularly shaped, and the third bump may be connected to the first electrode plate of the dummy storage capacitor, the dummy reset signal line, and the second electrode of the dummy reset transistor (the second electrode of the dummy first transistor and the second electrode of the dummy seventh transistor), respectively, through via holes on an insulating layer.

In an exemplary embodiment, the data signal line Data may be a straight line of equal width, or a straight line of unequal width.

Figure 12A:
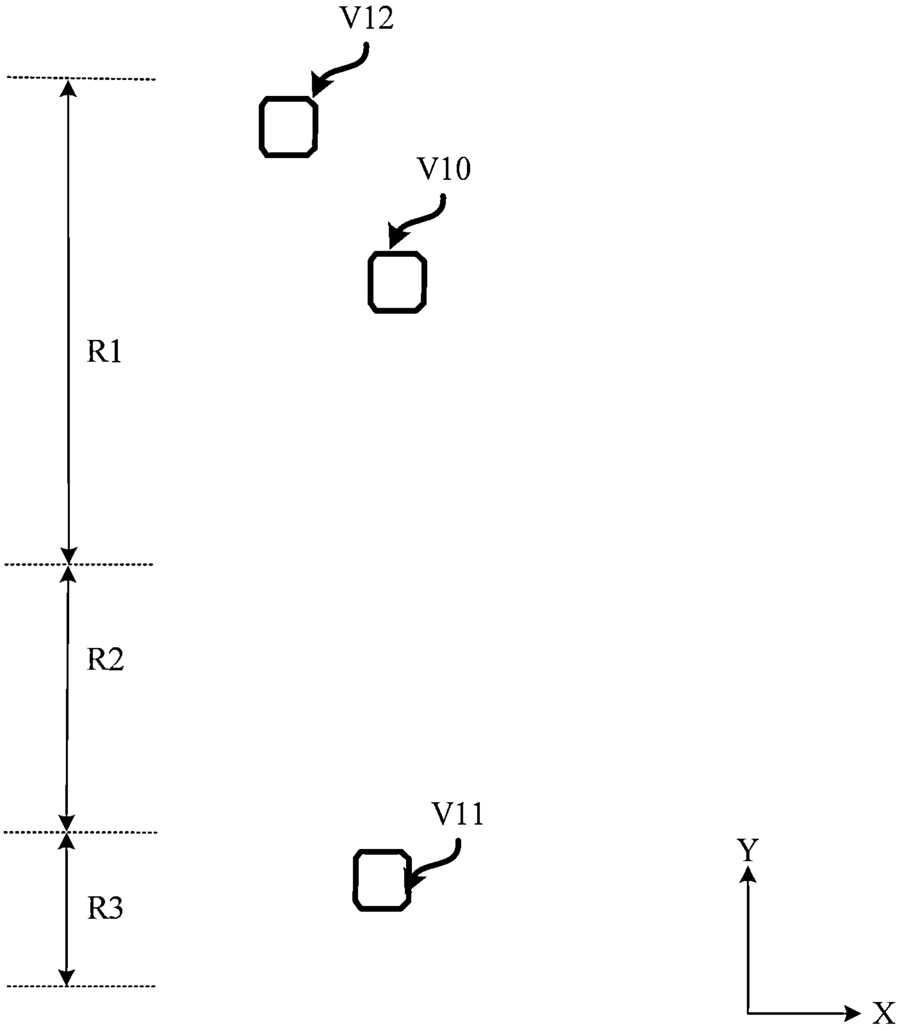
FIG. 12A is a schematic planar view of a first planarization layer for a normal pixel.
Figure 12B:
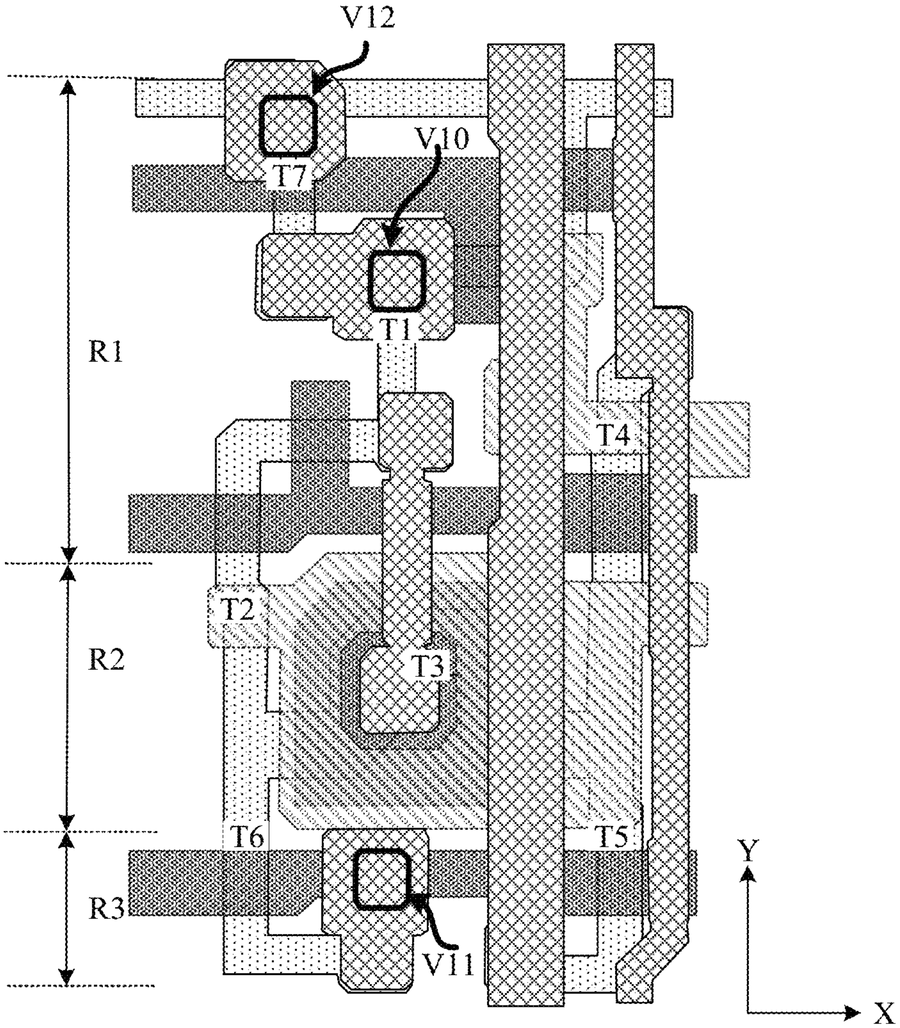
FIG. 12B is a schematic planar view of a display substrate after a first planarization layer for a normal pixel is formed.
Figure 12C:
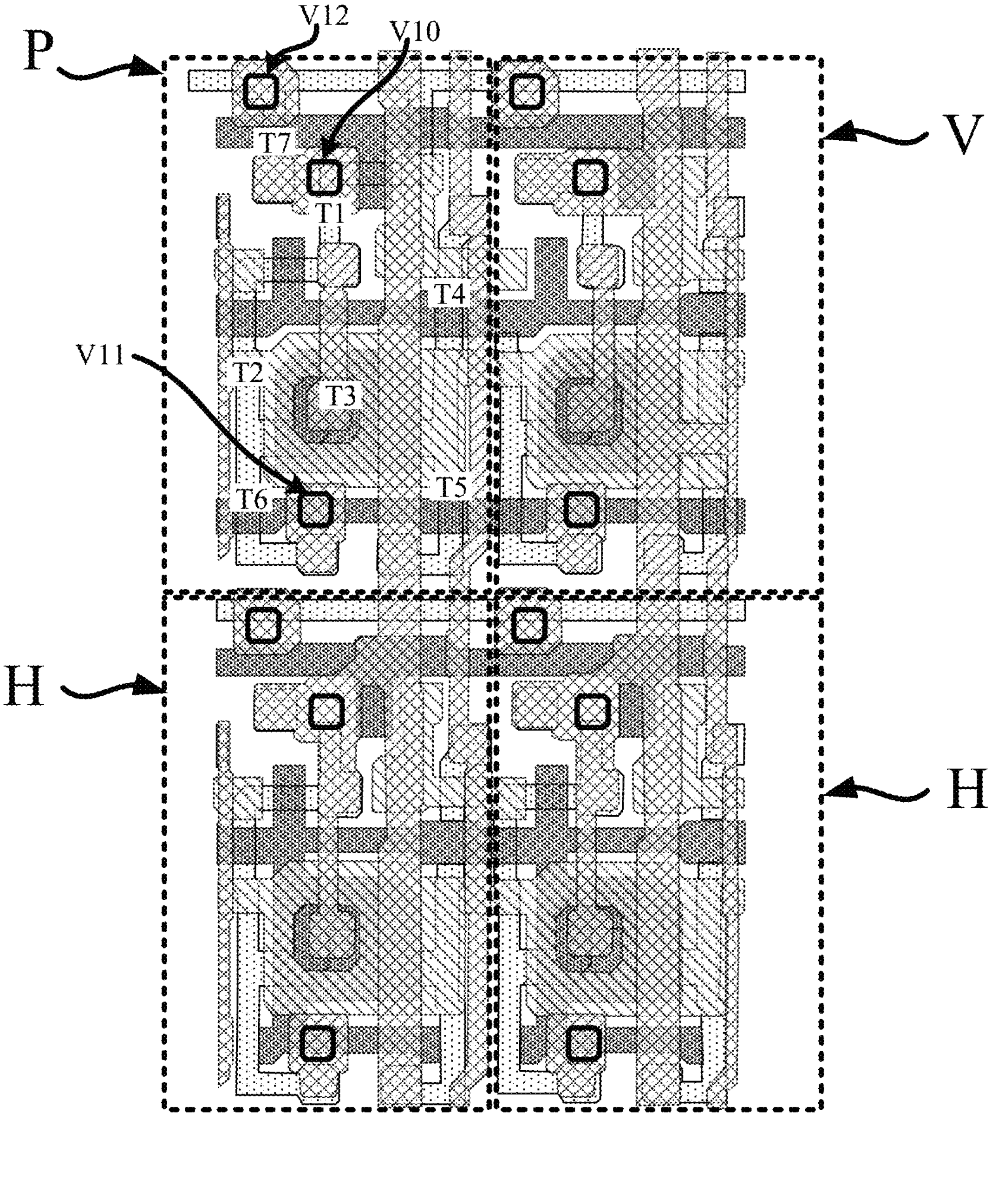
FIG. 12C is a schematic planar view of a display substrate after a first planarization layer for four pixels in a dotted line region in FIG. 5B is formed.

(6) A pattern of a first planarization layer 95 is formed. In an exemplary embodiment, forming a pattern of a first planarization layer 95 may include: coating a first planarization film on a substrate on which the pattern is formed, patterning the first planarization film using a patterning process, forming the first planarization layer 95 covering the third conductive layer. The first planarization layer 95 is provided with a tenth via hole V10, an eleventh via hole V11, and a twelfth via hole V12, as shown in FIGS. 12A, 12B, and 12C. FIG. 12A is a schematic planar view of the first planarization layer 95 for a normal pixel, FIG. 12B is a schematic planar view of the display substrate after the first planarization layer 95 for the normal pixel is formed, and FIG. 12C is a schematic planar view of the display substrate after the first planarization layer 95 for the four pixels in the dotted line region in FIG. 5B is formed.

The tenth via hole V10 is located in a region where the fourth connection electrode 46 is located, the eleventh via hole V11 is located in a region where the first connection electrode 43 is located, first planarization layers in the tenth via hole V10 and the eleventh via hole V11 are removed, respectively, to expose surfaces of the fourth connection electrode 46 and the first connection electrode 43. The tenth via hole V10 and the eleventh via hole V11 are arranged such that the anode connection electrode 52 that is formed later is connected to the second electrode of the sixth transistor T6 and the second electrode of the seventh transistor T7 through the two via holes.

The twelfth via hole V12 is located in a region where the third connection electrode 45 is located, the first planarization layer in the twelfth via hole V12 is removed to expose a surface of the third connection electrode 45, and the twelfth via hole V12 is arranged such that the second branch and the third branch of the initial signal line that are formed later are connected to the third connection electrode 45 through the via hole.

(7) A pattern of a fourth conductive layer is formed. Forming the fourth conductive layer may include: depositing a fourth metal film on the substrate on which the pattern is formed, patterning the fourth metal film using a patterning process, forming the fourth conductive layer disposed on the first planarization layer 95. The fourth conductive layer at least includes a second branch INIT-2 of the first initial signal line, a third branch INIT-3 of the first initial signal line, a fifth connection electrode 51 and an anode connection electrode 52, as shown in FIGS. 13, 6B, 6C and 6E. FIG. 13 is a schematic planar view of the fourth conductive layer for the normal pixel, FIG. 6B is a schematic planar view of the display substrate after the fourth conductive layer for the normal pixel is formed, FIG. 6C is a cross-sectional view of the AA region in FIG. 6B, and FIG. 6E is a schematic planar view of the display substrate after the fourth conductive layer for four pixels in the dotted line region in FIG. 5B is formed. In an exemplary embodiment, the fourth conductive layer may be referred to as a second source-drain metal layer (SD2).

In an exemplary embodiment, the second branch INIT-2 of the first initial signal line extends along the second direction Y, the third branch INIT-3 of the first initial signal line extends along the first direction X, the fifth connection electrode 51 is provided in a region where the second branch INIT-2 of the first initial signal line overlaps with the third branch INIT-3 of the first initial signal line, and the fifth connection electrode 51, the second branch INIT-2 of the first initial signal line and the third branch INIT-3 of the first initial signal line are an integrated structure connected to each other. An orthographic projection of the third branch INIT-3 of the first initial signal line on the substrate 10 overlaps with an orthographic projection of the first branch INIT-1 of the first initial signal line on the substrate 10. The third branch INIT-3 of the first initial signal line and the first branch INIT-1 of the first initial signal line form a double-layer wiring, and the fifth connection electrode 51 is connected to the third connection electrode 45 through a twelfth via hole V12.

In an exemplary embodiment, the second branch INIT-2 of the first initial signal line is provided with multiple bent portions INIT-21, an orthographic projection of a bent portion INIT-21 on the substrate 10 and an orthographic projection of the second connection electrode 44 on the substrate 10 have an overlapping region, which are arranged to shield the influence of data voltage jump on critical nodes, prevent the data voltage jump from affecting the potential of critical nodes of the pixel drive circuit, and improve the display effect.

In an exemplary embodiment, the anode connection electrode 52 is connected to the fourth connection electrode 46 and the first connection electrode 43 through the tenth via hole V10 and the eleventh via hole V11, respectively.

(8) A pattern of a second planarization layer is formed. In some exemplary embodiments, forming a pattern of a second planarization layer may include: coating a second planarization film on the substrate on which the aforementioned pattern is formed, patterning the second planarization film using a patterning process, and forming a second planarization layer covering the fourth conductive layer (not shown in the figure). The second planarization layer is provided with at least an anode via hole (i.e., the fourteenth via hole V14 in FIG. 6E).

In some exemplary embodiments, the fourteenth via hole is located in a region in which the anode connection electrode 52 is located, the second planarization layer in the fourteenth via hole is removed to expose a surface of the anode connection electrode 52, and the fourteenth via hole is arranged such that an anode that is formed later is electrically connected to the anode connection electrode 52 through the via hole.

So far, preparation of the pattern of the drive circuit layer on the substrate 10 is completed. In a plane parallel to the display substrate, the drive circuit layer may include multiple circuit units, each of the circuits may include a pixel drive circuit, and a scan signal line, a reset signal line, a light emitting signal line, a data signal line, a first power supply line, an initial signal line etc. connected to the pixel drive circuit. In a plane perpendicular to the display substrate, the drive circuit layer may include a first insulating layer 91, a semiconductor layer, a second insulating layer 92, a first conductive layer, a third insulating layer 93, a second conductive layer, a fourth insulating layer 94, a third conductive layer, a first planarization layer 95, a fourth conductive layer and the second planarization layer which are stacked sequentially on the substrate 10.

In an exemplary embodiment, after the preparation of the driver circuit layer is completed, an emitting structure layer is prepared on the driver circuit layer, and a preparation process of the emitting structure layer may include the following operations.

A transparent conductive thin film is deposited on the substrate on which the aforementioned patterns are formed, and the transparent conductive thin film is patterned through a patterning process to form an anode layer disposed on the second planarization layer.

A pixel define film is coated, and the pixel define film is patterned through a patterning process to form a pixel define layer (PDL). The pixel define layer of each sub-pixel is provided with a sub-pixel opening, and the sub-pixel opening exposes the anode.

An organic light emitting layer is formed using an evaporation or ink-jet printing process, and a cathode is formed on the organic light emitting layer.

The anode, the pixel define layer, the organic light emitting layer and the cathode form a pattern of the light emitting structure layer.

In an exemplary embodiment, after the preparation of the light emitting structure layer is completed, an encapsulation layer is prepared on the light emitting structure layer. The encapsulation layer includes a first encapsulation layer, a second encapsulation layer, and a third encapsulation layer that are stacked. The first encapsulation layer and the third encapsulation layer may be made of an inorganic material, and the second encapsulation layer may be made of an organic material. The second encapsulation layer is provided between the first encapsulation layer and the third encapsulation layer, which can ensure that external water vapor cannot enter the light emitting structure layer.

In an exemplary implementation, when a flexible display substrate is prepared, a preparation process of the display substrate may include processes such as peeling a glass carrier board, attaching a back film, and cutting, the present disclosure is not limited thereto.

In some exemplary embodiments, the substrate may be a flexible substrate or a rigid substrate. The rigid substrate may be made of, but not limited to, one or more of glass and quartz. The flexible substrate may be made of, but not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary embodiment, the flexible substrate may include a first flexible material layer, a first inorganic material layer, a semiconductor layer, a second flexible material layer and a second inorganic material layer which are stacked. The first flexible material layer and the second flexible material layer may be made of polyimide (PI), polyethylene terephthalate (PET) or a surface-treated polymer soft film, or the like; and the first inorganic material layer and the second inorganic material layer may be made of silicon nitride (SiNx) or silicon oxide (SiOx), etc., thereby improving the water-resistance and oxygen-resistance of the substrate. The material of the semiconductor layer may be amorphous silicon (a-si).

In some exemplary embodiments, the first conductive layer, the second conductive layer, the third conductive layer, and the fourth conductive layer may be made of a metal material, such as any one or more of Argentum (Ag), Copper (Cu), Aluminum (Al), and Molybdenum (Mo), or an alloy material of the aforementioned metals, such as an Aluminum-Neodymium alloy (AlNd) or a Molybdenum-Niobium alloy (MoNb), and may be in a single-layer structure, or a multilayer composite structure such as Mo/Cu/Mo. The anode layer may be made of a transparent conductive material, e.g., Indium Tin Oxide (ITO) or Indium Zinc Oxide (IZO). The first insulation layer, the second insulation layer, the third insulation layer, and the fourth insulation layer may be made of any one or more of silicon oxide (SiOx), silicon nitride (SiNx), and silicon oxynitride (SiON), and may be single-layer, multilayers, or composite layer. The first insulating layer is called the buffer (BUF) layer, which is used to improve the water-resistance and oxygen-resistance of the substrate, the second insulating layer is called the first gate insulating (GI1) layer, the third insulating layer is called the second gate insulating (GI2) layer, and the fourth insulating layer is called the interlayer insulating (ILD) layer. The first planarization layer (PLN1) and the second planarization layer (PLN2) may be made of an organic material. The semiconductor layer may be made of polysilicon (p-Si) or oxide.

In the display substrate of an embodiment of the present disclosure, the reset transistors in each row of sub-pixels are controlled by the reset signal line in the present row of sub-pixels, that is, the same-level reset mode is adopted, so that the GOAs in each row of sub-pixels drive scan signal line of a row and reset signal line of a row, thereby making the charging time of different regions same, and improving the display effect of the display panel.

The structure of the display substrate and its preparation process in the present disclosure are only exemplary. In some exemplary implementations, changes of corresponding structures and addition or reduction of the patterning process may be performed as practically required, which is not limited in the present disclosure.

As shown in FIGS. 3, 5B, 5C, 6A, and 14, an embodiment of the present disclosure further provides a display substrate, including multiple sub-pixels and a dummy pixel row H positioned between the multiple sub-pixels. At least one sub-pixel includes a pixel drive circuit and a light emitting device, the pixel drive circuit includes an initial signal line INIT, a reset signal line Reset, a scan signal line Gate, a light emitting signal line EM and multiple transistors. For example, according to FIGS. 5C, 6A, and 14, the pixel drive circuit includes a first reset signal line Reset1, a second reset signal line Reset2, a third reset signal line Reset3, a first scan signal line Gate1, and a second scan signal line Gate2.

The multiple transistors include a drive transistor (i.e., a third transistor T3 in FIG. 3), a first reset transistor (i.e., a first transistor T1 in FIG. 3) and a second reset transistor (i.e., a seventh transistor T3 in FIG. 3). The drive transistor is configured to provide a drive current to the light emitting device, the first reset transistor is configured to reset a gate of the drive transistor via the initial signal line INIT under control of the reset signal line Reset, and the second reset transistor is configured to reset an anode of the light emitting device via the initial signal line INIT under control of the scan signal line Gate.

The display substrate includes multiple gate connection electrodes 53 disposed across the dummy pixel rows H, and a gate connection electrode 53 is configured to connect a gate electrode of the first reset transistor on a side of the dummy pixel row H and a gate electrode of the second reset transistor on the other side of the dummy pixel row H.

In some exemplary embodiments, the gate connection electrode 53 is located on different conductive layers from the gate electrodes of the multiple transistors.

In some exemplary embodiments, in a plane perpendicular to the display substrate, the display substrate includes a semiconductor layer, a first conductive layer, a second conductive layer, a third conductive layer, and a fourth conductive layer arranged in sequence on the substrate, and an insulating layer arranged between the semiconductor layer and the first conductive layer or insulating layers between the respective conductive layers.

The semiconductor layer includes active layers of multiple transistors, the first conductive layer includes gate electrodes of multiple transistors, the scan signal line Gate, the reset signal line Reset and a first electrode plate of a storage capacitor, the second conductive layer includes a second electrode plate of the storage capacitor, the third conductive layer includes a first power supply line VDD and a Data signal line Data, and the fourth conductive layer includes an anode connection electrode.

Exemplarily, the gate connection electrodes 53 may be located on any one or more of the third conductive layer, the fourth conductive layer, and the anode layer, which is not limited by the present disclosure.

In the embodiment, the gate electrodes of the second reset transistors in sub-pixels of the last row of the dummy pixel row and the gate electrodes of the first reset transistors in sub-pixels of the next row of the dummy pixel row are connected by the gate connection electrode, so that the second reset transistors in sub-pixels of the last row of the dummy pixel row and the first reset transistors in sub-pixels of the next row of the dummy pixel row share the same reset signal line, thereby the GOAs in sub-pixels in each row drive scan signal in a row and reset signal in a row, i.e., driving signals in two rows at the same time, thus improving the display effect.

The present disclosure further provides a preparation method of a display substrate to prepare the display substrate according to any of the above embodiments. The display substrate includes multiple sub-pixels, at least one of the sub-pixels is divided into a first region, a second region and a third region, and the first region and the third region are respectively located at two sides of the second region. In some exemplary embodiments, the preparation method of the display substrate may include the following acts.

A semiconductor layer is formed on a substrate, the semiconductor layer includes an initial signal line and active layers of multiple transistors, the multiple transistors include a drive transistor, a reset transistor and a light emitting control transistor, the drive transistor is located in the second region, the initial signal line connected to the sub-pixel and the reset transistor is located in the first region, and the light emitting control transistor is located in the third region.

A first conductive layer is formed on the semiconductor layer, the first conductive layer includes gate electrodes of multiple transistors, a reset signal line and a light emitting signal line, the reset signal line connected to the sub-pixel is located in the first region, the light emitting signal line connected to the sub-pixel is located in the third region, the drive transistor is configured to provide a drive current to the light emitting device, the reset transistor is configured to reset the gate of the drive transistor and/or the anode of the light emitting device through the initial signal line under control of the reset signal line, and the light emitting control transistor is configured to allow or forbid the drive current to pass through under control of the light emitting signal line.

For a display substrate prepared by the method for preparing the display substrate according to the present disclosure, its implementation principle and implementation effect are similar as those of the display substrate described above, and will not be repeated here.

The present disclosure further provides a method of driving a display substrate including multiple sub-pixels. At least one of the sub-pixels includes a pixel drive circuit and a light emitting device, as shown in FIG. 6D. The pixel drive circuit includes a drive sub-circuit 101, a first reset sub-circuit 102, a second reset sub-circuit 103, a data writing sub-circuit 104, a compensation sub-circuit 105 and a light emitting control sub-circuit 106.

The driving method includes: in an initialization stage, the first reset sub-circuit 102 resets a control terminal of the drive sub-circuit 101 under control of a reset signal; the second reset sub-circuit 103 resets a first terminal of the light emitting device under the control of the reset signal; in a data writing and compensation stage, the data writing sub-circuit 104 writes a data signal to the drive sub-circuit 101 under control of a scan signal, and the compensation sub-circuit 105 compensates the drive sub-circuit 101; in a light emitting stage, the light emitting control sub-circuit 106 applies a drive current generated by the drive sub-circuit 101 to the light emitting device to make it emit light under control of a light emitting signal; wherein, the first reset sub-circuit 102 and the second reset sub-circuit 103 in the same sub-pixel are controlled by the same reset signal line.

In some exemplary embodiments, as shown in FIG. 6D, the drive sub-circuit 101 includes a third transistor T3. A gate electrode of the third transistor T3 is connected to the first node N1 (i.e. the first terminal of the storage capacitor C), a first electrode of the third transistor T3 is connected to the second node N2 (i.e. the second electrode of the fourth transistor T4), and a second electrode of the third transistor T3 is connected to the third node N3 (i.e. the first electrode of the second transistor T2).

In some exemplary embodiments, as shown in FIG. 6D, the first reset sub-circuit 102 includes a first transistor T1. A gate electrode of the first transistor T1 is connected to the reset signal line Reset, a first electrode of the first transistor T1 is connected to the initial signal line INIT, and a second electrode of the first transistor T1 is connected to the first node N1.

In some exemplary embodiments, as shown in FIG. 6D, the second reset sub-circuit 103 includes a seventh transistor T7. A gate electrode of the seventh transistor T7 is connected to the reset signal line Reset, a first electrode of the seventh transistor T7 is connected to the initial signal line INIT, and a second electrode of the seventh transistor T7 is connected to a fourth node N4 (i.e., a first terminal of the light emitting device).

In some exemplary embodiments, as shown in FIG. 6D, the data writing sub-circuit 104 includes a fourth transistor T4. A gate electrode of the fourth transistor T4 is connected to the scan signal line Gate, a first electrode of the fourth transistor T4 is connected to the data signal line Data, and a second electrode of the fourth transistor T4 is connected to the second node N2.

In some exemplary embodiments, as shown in FIG. 6D, the compensation sub-circuit 105 includes a second transistor T2 and a storage capacitor C. A gate electrode of the second transistor T2 is connected to the scan signal line Gate, a first electrode of the second transistor T2 is connected to the third node N3, and a second electrode of the second transistor T2 is connected to the first node N1. A first terminal of the storage capacitor C is connected to a first power supply line VDD, and a second terminal of the storage capacitor C is connected to the first node N1.

In some exemplary embodiments, as shown in FIG. 6D, the light emitting control sub-circuit 106 includes a fifth transistor T5 and a sixth transistor T6. A gate electrode of the fifth transistor T5 is connected to the light emitting signal line EM, a first electrode of the fifth transistor T5 is connected to the first power supply line VDD, and a second electrode of the fifth transistor T5 is connected to the second node N2. A gate electrode of the sixth transistor T6 is connected to the emitting signal line EM, a first electrode of the sixth transistor T6 is connected to the third node N3, and a second electrode of the sixth transistor T6 is connected to the fourth node N4.

The present disclosure further provides a display apparatus which includes the aforementioned display substrate. The display apparatus may be any product or component with a display function, such as a mobile phone, a tablet computer, a television, a display, a laptop computer, a digital photo frame, or a navigator, and the embodiments of the present invention are not limited thereto.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modification and variation in forms and details of implementations without departing from the spirit and scope of the present disclosure. However, the patent protection scope of the present invention should be subject to the scope defined by the appended claims.

The invention claimed is:

1. A display substrate, comprising a plurality of sub-pixels, wherein at least one of the plurality of sub-pixels comprises a pixel drive circuit and a light emitting device, the pixel drive circuit comprises an initial signal line, a reset signal line and a plurality of transistors, and the initial signal line comprises a first branch;

the plurality of transistors comprise a drive transistor configured to provide a drive current to the light emitting device, a first reset transistor configured to reset a gate of the drive transistor through the first branch of the initial signal line under control of the reset signal line, and a second reset transistor configured to reset a first terminal of the light emitting device through the first branch of the initial signal line under the control of the reset signal line; and the first reset transistor and the second reset transistor in a same sub-pixel are controlled by a same reset signal line;

wherein in a plane perpendicular to the display substrate, the display substrate comprises a semiconductor layer, a first conductive layer, a second conductive layer, a third conductive layer, and a fourth conductive layer, that are arranged in sequence on a substrate, and an insulating layer arranged between the semiconductor layer and the first conductive layer or insulating layers between respective conductive layers;

the semiconductor layer comprises active layers of a plurality of transistors and the first branch of the initial signal line, the first conductive layer comprises gate electrodes of the plurality of transistors, the reset signal line and a first electrode plate of a storage capacitor, the second conductive layer comprises a second electrode plate of the storage capacitor, the third conductive layer comprises a second connection electrode, and the fourth conductive layer comprises a second branch of the initial signal line;

the second connection electrode is configured to connect the gate of the drive transistor and a second region of the first reset transistor through a via hole on an insulating layer, and the second branch of the initial signal line is connected to the first branch of the initial signal line through a via hole on an insulating layer; and an orthographic projection of the second branch of the initial signal line on the substrate at least partially overlaps with an orthographic projection of the second connection electrode on the substrate.

2. The display substrate according to claim 1, wherein the first branch of the initial signal line extends in a first direction, and the first branch of the initial signal line is disposed in a same layer as active layers of the plurality of transistors.

3. The display substrate according to claim 1, wherein the pixel drive circuit further comprises a storage capacitor;

within the same sub-pixel, both the first reset transistor and the second reset transistor are located between the first branch of the initial signal line and the storage capacitor.

4. The display substrate according to claim 1, wherein the first reset transistor is located on a side of the second reset transistor in a first direction within the same sub-pixel.

5. The display substrate according to claim 1, wherein the pixel drive circuit further comprises a first light emitting control transistor, a second light emitting control transistor, and an anode connection electrode, the anode connection electrode is connected to a second electrode of the first light emitting control transistor through an anode via hole, wherein:

the first light emitting control transistor, the anode via hole and the second light emitting control transistor are arranged in a first direction, and the anode via hole is located between the first light emitting control transistor and the second light emitting control transistor.

6. The display substrate according to claim 1, wherein the active layers of the plurality of transistors each comprise a channel region, a first region located on a side of the channel region and corresponding to a source electrode, and a second region located on the other side of the channel region and corresponding to a drain electrode, a first region of the active layer of the first reset transistor, a first region of an active layer of the second reset transistor, and the first branch of the initial signal line are connected to each other as an integrated structure.

7. The display substrate according to claim 1, wherein the active layer of the first reset transistor has an "L" shape, the reset signal line is provided with a first bump in each sub-pixel, and a region where the reset signal line and the first bump overlap with a channel region of the first reset transistor serves as gate electrodes of the first reset transistor with a double-gate structure.

8. The display substrate according to claim 1, wherein the second branch of the initial signal line comprises a main body portion extending in a second direction, and a bent portion comprising two first extension portions and a second extension portion disposed between the two first extension portions, the first extension portions extend in a first direction, the second extension portion extends in the second direction, the first direction intersects the second direction, and a width of the second extension portion in the first direction is greater than a width of the main body portion in the first direction.

9. The display substrate according to claim 1, wherein the third conductive layer further comprises a first power supply line, a first connection electrode and a fourth connection electrode, the fourth conductive layer further comprises an anode connection electrode, and a light emitting control transistor comprises a first light emitting control transistor;

the anode connection electrode connects the first connection electrode and the fourth connection electrode through a via hole on an insulating layer, the first connection electrode connects a second region of the first light emitting control transistor through a via hole on an insulating layer, and the fourth connection electrode connects a second region of the second reset transistor through a via hole on an insulating layer; and an orthographic projection of the anode connection electrode on the substrate at least partially overlaps with an orthographic projection of the first power supply line on the substrate.

10. The display substrate according to claim 9, wherein the orthographic projection of the anode connection electrode on the substrate at least partially overlaps with an orthographic projection of a second electrode of the first reset transistor on the substrate.

11. The display substrate according to claim 1, wherein the fourth conductive layer further comprises a fifth connection electrode and a third branch of the initial signal line;

the third branch of the initial signal line extends in a first direction, and the second branch of the initial signal line extends in a second direction, wherein the first direction intersects the second direction;

the fifth connection electrode, the second branch of the initial signal line and the third branch of the initial signal line are connected to each other as an integrated structure, and an orthographic projection of the third branch of the initial signal line on the substrate at least partially overlaps with an orthographic projection of the first branch of the initial signal line on the substrate.

12. The display substrate according to claim 1, further comprising dummy pixel rows among the plurality of sub-pixels, a dummy pixel row comprises a plurality of dummy sub-pixels, a dummy sub-pixel comprises a dummy pixel drive circuit comprising a dummy reset transistor and a dummy data writing transistor, a channel region of the dummy reset transistor and a channel region of the dummy data writing transistor each have a broken structure.

13. The display substrate according to claim 12, further comprising a first power supply line, the dummy pixel drive circuit comprises a dummy storage capacitor, a dummy initial signal line, a dummy reset signal line, a dummy light emitting signal line and a dummy scan signal line, the dummy light emitting signal line, a first electrode plate of the dummy storage capacitor and the dummy scan signal line are connected to each other as an integrated structure, the first electrode plate and a second electrode plate of the dummy storage capacitor and the dummy reset signal line are respectively connected to the first power supply line through a via hole on an insulating layer.

14. A display substrate, comprising a plurality of sub-pixels, and dummy pixel rows located among the plurality of sub-pixels, wherein at least one of the plurality of sub-pixels comprises a pixel drive circuit and a light emitting device, and the pixel drive circuit comprises an initial signal line, a reset signal line, a scan signal line, a light emitting signal line and a plurality of transistors;

the plurality of transistors comprise a drive transistor, a first reset transistor, and a second reset transistor, the drive transistor is configured to provide a drive current to the light emitting device, the first reset transistor is configured to reset a gate of the drive transistor through the initial signal line under control of the reset signal line, and the second reset transistor is configured to reset an anode of the light emitting device through the initial signal line under control of the scan signal line; and the display substrate comprises a plurality of gate connection electrodes disposed across the dummy pixel rows, a gate connection electrode is configured to connect a gate electrode of a first reset transistor on a side of a dummy pixel row and a gate electrode of a second reset transistor on the other side of the dummy pixel row;

wherein the gate connection electrodes and gate electrodes of the plurality of transistors are located on different conductive layers.

15. A display apparatus, comprising a display substrate according to claim 1.

16. The display substrate according to claim 14, wherein the gate connection electrodes are located on any one or more of a third conductive layer, a fourth conductive layer, and an anode layer.

17. A display apparatus, comprising a display substrate according to claim 14.

* * * * *